United States Patent
Merlin et al.

(10) Patent No.: US 9,408,214 B2
(45) Date of Patent: Aug. 2, 2016

(54) METHODS AND SYSTEMS FOR PROTECTION AND BANDWIDTH SELECTION FOR DOWNLINK AND UPLINK FREQUENCY DIVISION MULTIPLE ACCESS COMMUNICATIONS

(71) Applicant: QUALCOMM Incorporated, San Diego, CA (US)

(72) Inventors: Simone Merlin, San Diego, CA (US); Gwendolyn Denise Barriac, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 14/805,768

(22) Filed: Jul. 22, 2015

(65) Prior Publication Data

US 2016/0029389 A1  Jan. 28, 2016

Related U.S. Application Data

(60) Provisional application No. 62/028,507, filed on Jul. 24, 2014.

(51) Int. Cl.
*H04W 4/00* (2009.01)
*H04W 72/04* (2009.01)
(Continued)

(52) U.S. Cl.
CPC ............ *H04W 72/0453* (2013.01); *H04J 1/14* (2013.01); *H04W 28/26* (2013.01);
(Continued)

(58) Field of Classification Search
CPC ................... H04W 72/0453; H04W 74/0816; H04W 84/12; H04W 28/26; H04W 72/0406; H04W 72/0446; H04W 74/04; H04J 1/14
See application file for complete search history.

(56) References Cited

U.S. PATENT DOCUMENTS

| 2008/0112380 A1* | 5/2008 | Fischer ............. H04W 74/0816 370/338 |
| 2011/0064065 A1* | 3/2011 | Nakajima ............. H04L 1/1614 370/338 |

(Continued)

FOREIGN PATENT DOCUMENTS

| WO | WO-2006134704 A1 | 12/2006 |
| WO | WO-2008060921 A1 | 5/2008 |

(Continued)

OTHER PUBLICATIONS

International Search Report and Written Opinion—PCT/US2015/041708—ISA/EPO—Sep. 30, 2015.

*Primary Examiner* — Clemence Han
(74) *Attorney, Agent, or Firm* — Knobbe Martens Olson & Bear LLP

(57) ABSTRACT

Systems, methods, and devices for protecting frequency division multiple access communications are provided. A method for wireless communications in a communication system over a primary frequency channel and a secondary frequency channel is provided. The method includes transmitting by an access point a first reservation frame utilizing the primary frequency channel, the first reservation frame indicating a first single time interval reserved for uplink and downlink communications over the primary frequency channel with a plurality of wireless devices. The method includes transmitting by the access point a second reservation frame utilizing the secondary frequency channel, the second reservation frame indicating a second single time interval reserved for uplink and downlink communications over the secondary frequency channel. The method includes communicating between the access point and the plurality of wireless devices over the primary frequency channel during the first single time interval.

24 Claims, 15 Drawing Sheets

(51) Int. Cl.
- *H04W 74/08* (2009.01)
- *H04J 1/14* (2006.01)
- *H04W 28/26* (2009.01)
- *H04W 74/04* (2009.01)
- *H04W 84/12* (2009.01)

(52) U.S. Cl.
CPC ......... *H04W 72/0406* (2013.01); *H04W 74/04* (2013.01); *H04W 74/0816* (2013.01); *H04W 72/0446* (2013.01); *H04W 84/12* (2013.01)

(56) References Cited

U.S. PATENT DOCUMENTS

| | | | |
|---|---|---|---|
| 2012/0008599 A1* | 1/2012 | Marin | H04W 74/006 370/336 |
| 2012/0113952 A1* | 5/2012 | Kneckt | H04W 72/0406 370/330 |
| 2012/0182886 A1* | 7/2012 | Ong | H04W 74/0816 370/252 |
| 2012/0182963 A1* | 7/2012 | Kneckt | H04W 72/0453 370/330 |
| 2012/0207036 A1* | 8/2012 | Ong | H04W 74/0816 370/252 |
| 2013/0051256 A1* | 2/2013 | Ong | H04W 74/0816 370/252 |
| 2013/0148615 A1* | 6/2013 | Li | H04W 28/26 370/329 |
| 2014/0092857 A1* | 4/2014 | Kneckt | H04W 74/04 370/329 |
| 2014/0092860 A1* | 4/2014 | Kneckt | H04W 72/1205 370/329 |
| 2014/0098724 A1 | 4/2014 | Park | |

FOREIGN PATENT DOCUMENTS

| | | |
|---|---|---|
| WO | WO-2011123631 A1 | 10/2011 |
| WO | WO-2012172157 A1 | 12/2012 |

* cited by examiner

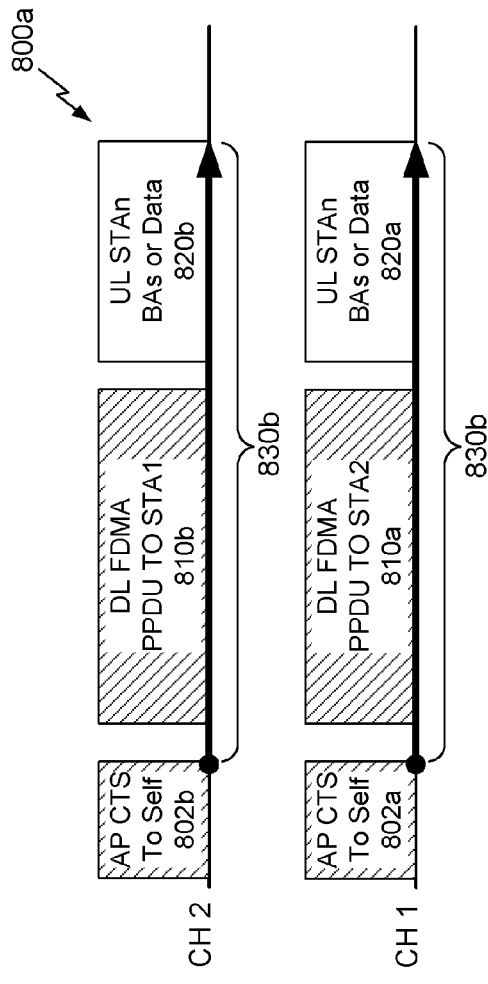
FIG. 8A
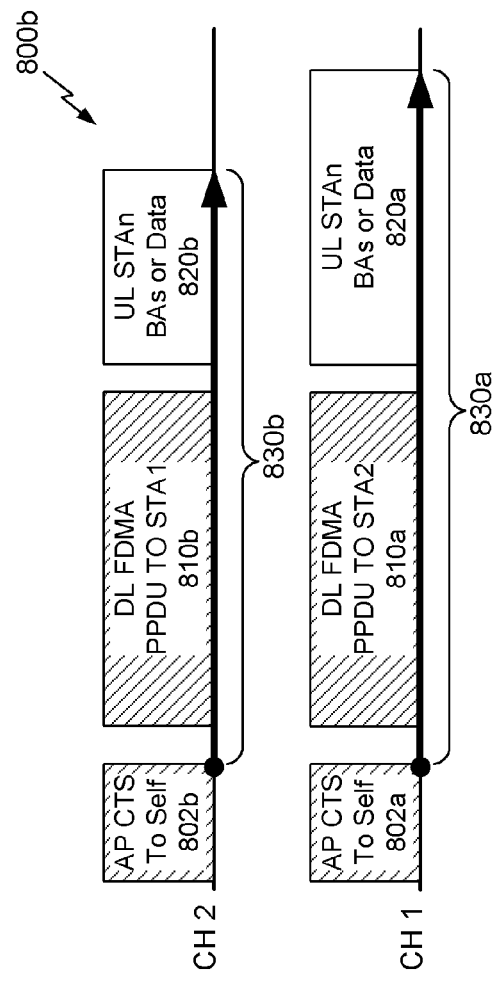
FIG. 8B
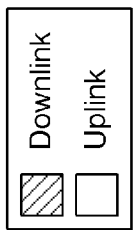

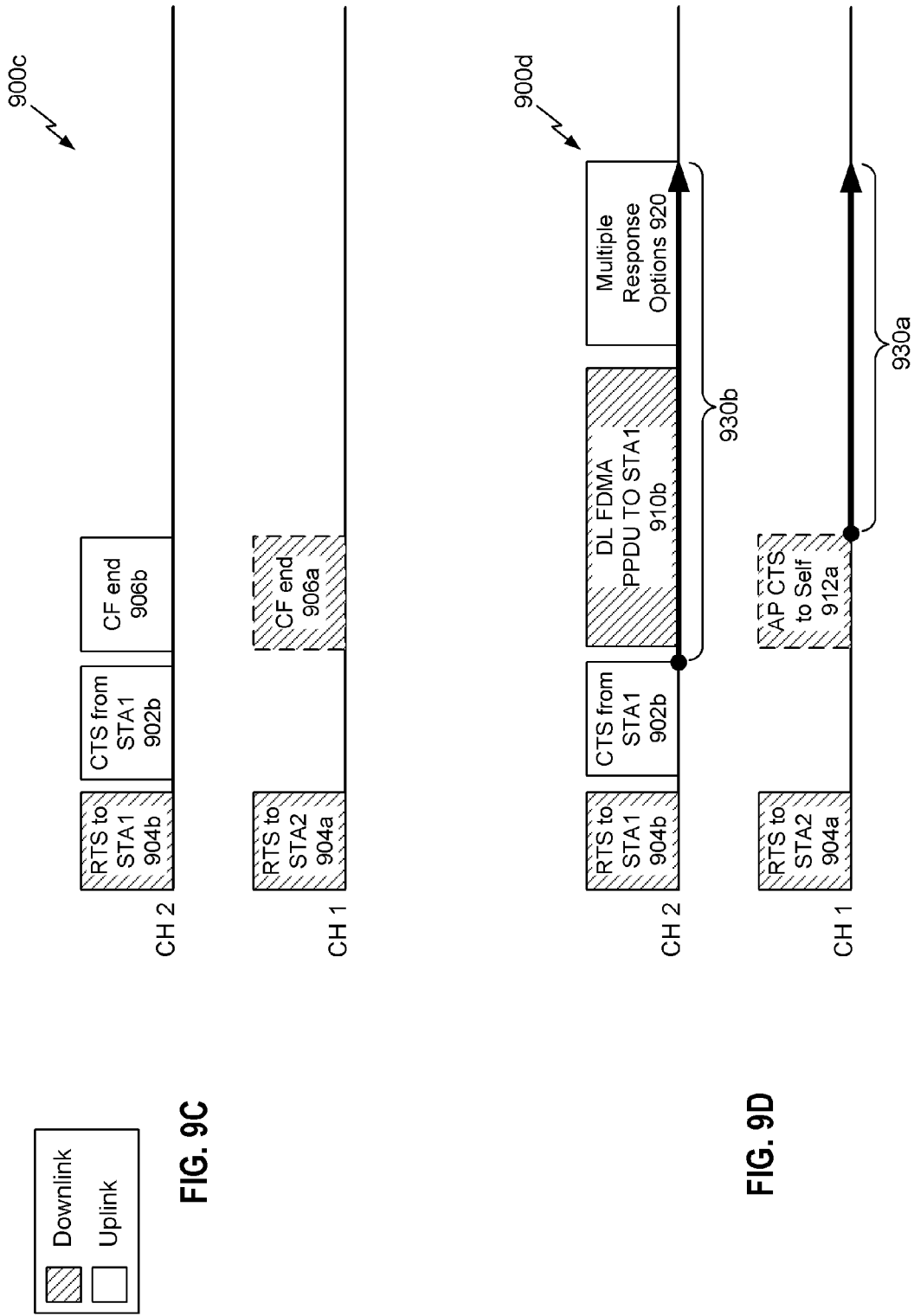

METHODS AND SYSTEMS FOR PROTECTION AND BANDWIDTH SELECTION FOR DOWNLINK AND UPLINK FREQUENCY DIVISION MULTIPLE ACCESS COMMUNICATIONS

CLAIM OF PRIORITY UNDER 35 U.S.C. §119

The present application for patent claims priority to Provisional Application No. 62/028,507 entitled "METHODS AND SYSTEMS FOR PROTECTION AND BANDWIDTH SELECTION FOR DOWNLINK AND UPLINK FREQUENCY DIVISION MULTIPLE ACCESS COMMUNICATIONS" filed Jul. 24, 2014, and assigned to the assignee hereof. Provisional Application No. 62/028,507 is hereby expressly incorporated by reference herein.

FIELD

The present application relates generally to wireless communications, and more specifically to systems, methods, and devices for protection and bandwidth selection for downlink and uplink frequency division multiple access communications.

BACKGROUND

In many telecommunication systems, communications networks are used to exchange messages among several interacting spatially-separated devices. Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

However, multiple wireless networks may exist in the same building, in nearby buildings, and/or in the same outdoor area. The prevalence of multiple wireless networks may cause interference, reduced throughput (e.g., because each wireless network is operating in the same area and/or spectrum), and/or prevent certain devices from communicating. Thus, improved systems, methods, and devices for protection and bandwidth selection for downlink and uplink frequency division multiple access communications are desired.

SUMMARY

The systems, methods, and devices of the present application each have several aspects, no single one of which is solely responsible for its desirable attributes. Without limiting the scope of this application as expressed by the claims which follow, some features will now be discussed briefly. After considering this discussion, and particularly after reading the section entitled "Detailed Description" one will understand how the features of this application provide advantages that include improved communications between access points and stations in a wireless network.

One aspect of this disclosure provides a method for wireless communications in a communication system over a primary frequency channel and a secondary frequency channel. The method comprises transmitting by an access point a first reservation frame utilizing the primary frequency channel, the first reservation frame indicating a first single time interval reserved for uplink and downlink communications over the primary frequency channel with a plurality of wireless devices. The method comprises transmitting by the access point a second reservation frame utilizing the secondary frequency channel, the second reservation frame indicating a second single time interval reserved for uplink and downlink communications over the secondary frequency channel with the plurality of wireless devices. The method comprises communicating between the access point and the plurality of wireless devices over the primary frequency channel during the first single time interval.

Another aspect provides an access point for wireless communications in a communication system over a primary frequency channel and a secondary frequency channel. The access point comprises a processor configured to instruct a transceiver to transmit a first reservation frame utilizing the primary frequency channel, the first reservation frame indicating a first single time interval reserved for uplink and downlink communications over the primary frequency channel with a plurality of wireless devices. The processor is further configured to instruct the transmitter to transmit a second reservation frame utilizing the secondary frequency channel, the second reservation frame indicating a second single time interval reserved for uplink and downlink communications over the secondary frequency channel with the plurality of wireless devices. The processor is further configured to instruct the transceiver to communicate with the plurality of wireless devices over the primary frequency channel during the first single time interval and over the second frequency channel during the second single time interval.

Another aspect provides non-transitory computer-readable medium comprising code. The code, when executed, causes an access point for wireless communications in a communication system over a primary frequency channel and a secondary frequency channel to transmit a first reservation frame utilizing the primary frequency channel, the first reservation frame indicating a first single time interval reserved for uplink and downlink communication over the primary frequency channel with a plurality of wireless devices. The code, when executed, further causes the access point to transmit a second reservation frame utilizing the secondary frequency channel, the second reservation frame indicating a second single time interval reserved for uplink and downlink communications over the secondary frequency channel with a plurality of wireless devices. The code, when executed, further causes the access point to communicate between the access point and the plurality of wireless devices over the primary frequency channel during the first single time interval and over the secondary frequency channel during the second single time interval.

Another aspect provides an access point for wireless communications in a communication system over a primary frequency channel and a secondary frequency channel. The access point comprises means for transmitting a first reservation frame utilizing the primary frequency channel, the first reservation frame indicating a first single time interval reserved for uplink and downlink communications over the primary frequency channel with a plurality of wireless devices. The access point further comprises means for transmitting a second reservation frame utilizing the secondary frequency channel, the second reservation frame indicating a second single time interval reserved for uplink and downlink communications over the secondary frequency channel with a plurality of wireless devices. The access point comprises means for communicating between the access point and the plurality of wireless devices over the primary frequency channel during the first single time interval and over the secondary frequency channel during the second single time interval.

BRIEF DESCRIPTION OF THE DRAWINGS

FIGS. 8A-8D show timing diagrams in which aspects of the present disclosure may be employed.

FIGS. 9A-9D show other timing diagrams in which aspects of the present disclosure may be employed.

DETAILED DESCRIPTION

Figure 1:
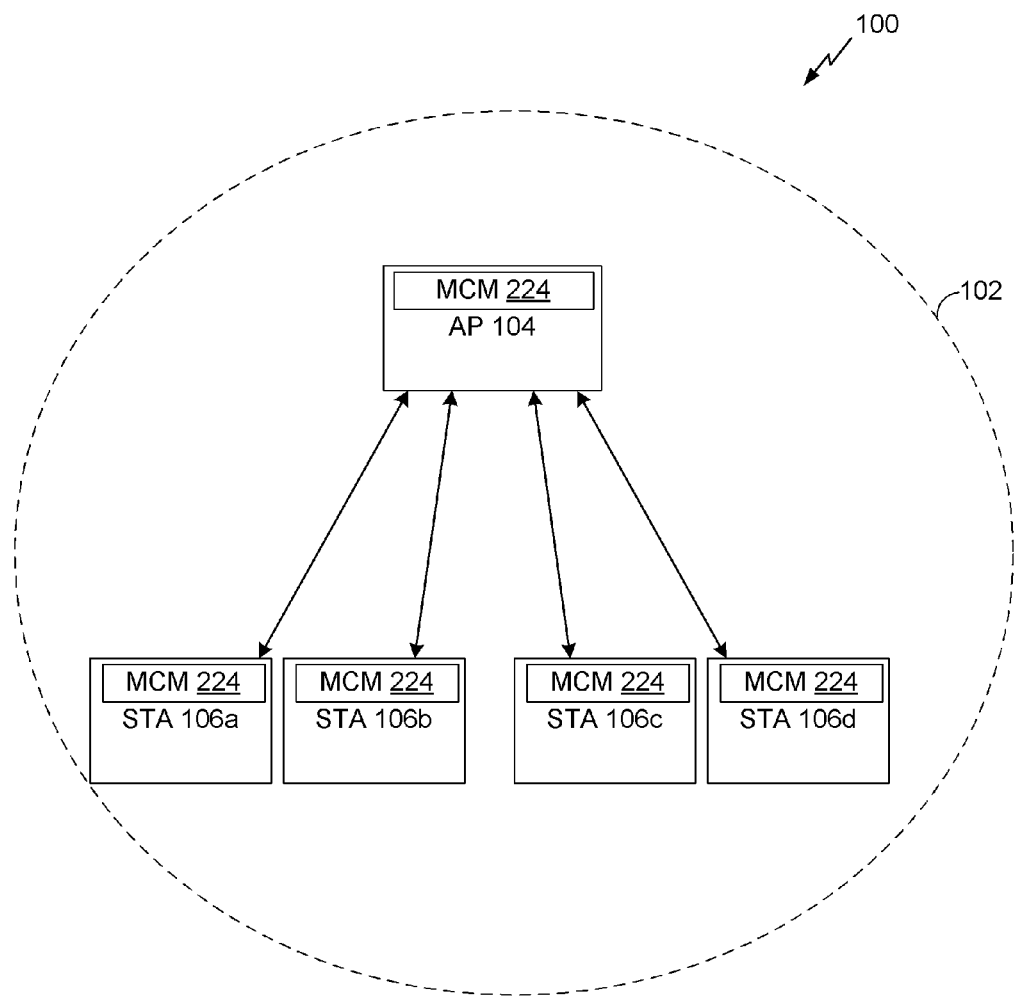
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present application. For example, an apparatus may be implemented or a method may be practiced using any number of the aspects set forth herein. In addition, the scope of the application is intended to cover such an apparatus or method which is practiced using other structure, functionality, or structure and functionality in addition to or other than the various aspects of the application set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing the high-efficiency 802.11 protocol using the techniques disclosed herein may include allowing for increased peer-to-peer services (e.g., Miracast, WiFi Direct Services, Social WiFi, etc.) in the same area, supporting increased per-user minimum throughput requirements, supporting more users, providing improved outdoor coverage and robustness, and/or consuming less power than devices implementing other wireless protocols.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement a high-efficiency 802.11 standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example at least one of the 802.11ah, 802.11ac, 802.11n, 802.11g and 802.11b standards. The wireless communication system 100 may include an AP 104, which communicates with one or more of STA 106a, 106b, 106c, and/or 106d (collectively referred to as STAs 106 or STAs 106a-106d).

A variety of processes and methods may be used for transmissions in the wireless communication system 100 between the AP 104 and the STAs 106. For example, signals may be transmitted and received between the AP 104 and the STAs 106 in accordance with orthogonal frequency division multiplexing (OFDM) and/or orthogonal frequency division multiple access (OFDMA) techniques. If this is the case, the wireless communication system 100 may be referred to as an OFDM/OFDMA system. Alternatively, signals may be transmitted and received between the AP 104 and the STAs 106 in accordance with code division multiple access (CDMA) techniques. If this is the case, the wireless communication system 100 may be referred to as a CDMA system.

A communication link that facilitates transmission from the AP 104 to one or more of the STAs 106 may be referred to as a downlink (DL), and a communication link that facilitates transmission from one or more of the STAs 106 to the AP 104 may be referred to as an uplink (UL). Alternatively, a downlink may be referred to as a forward link or a forward channel, and an uplink may be referred to as a reverse link or a reverse channel.

The AP 104 may provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Each of the AP 104 and the STAs 106a-106d may include a multiplex control module 224, which will be described in more detail in connection with FIG. 2, and that may be utilized to direct or control protection and bandwidth selection for downlink and uplink frequency division multiple access communications.

Figure 2:
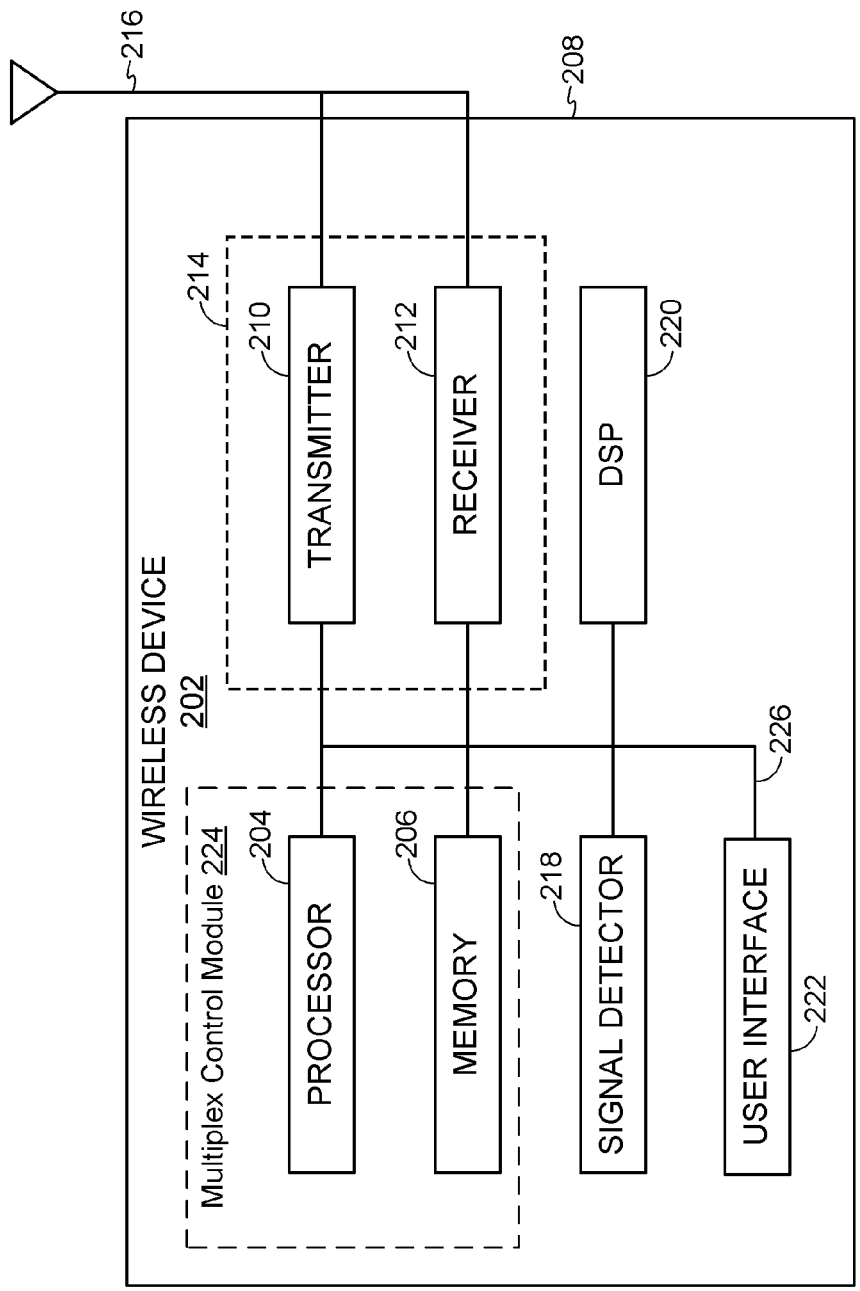
FIG. 2 shows frequency multiplexing techniques that may be employed within the wireless communication systems of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include the multiplex control module 224, which may be configured to perform any method, action or procedure described in the present application in connection with the AP 104 and/or the STAs 106a-106d. The multiplex control module 224 may include a processor 204 which controls operation of the wireless device 202. The processor 204 may also be referred to as a central processing unit (CPU). In some implementations, the multiplex control module 224 may additionally comprise a memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 170 and a receiver 172 to allow transmission and reception of data between the wireless device 202 and a remote location. The transmitter 170 and receiver 172 may be combined into a transceiver 174. An antenna 176 may be attached to the housing 208 and electrically coupled to the transceiver 174. The wireless device 202 may also include (not shown) multiple transmitters, multiple receivers, multiple transceivers, and/or multiple antennas, which may be utilized during multiple in multiple out (MIMO) communications, for example.

The wireless device 202 may also include a signal detector 178 that may be used in an effort to detect and quantify the level of signals received by the transceiver 174. The signal detector 178 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 178 and/or the DSP 220. Further, each of the components illustrated in FIG. 2 may be implemented using a plurality of separate elements.

As discussed above, the wireless device 202 may comprise an AP 104 or a STA 106, and may be used to transmit and/or receive communications. The communications exchanged between devices in a wireless network may include data units which may comprise packets or frames. In some aspects, the data units may include data frames, control frames, and/or management frames. Data frames may be used for transmitting data from an AP and/or a STA to other APs and/or STAs. Control frames may be used together with data frames for performing various operations and for reliably delivering data (e.g., acknowledging receipt of data, polling of APs, area-clearing operations, channel acquisition, carrier-sensing maintenance functions, etc.). Management frames may be used for various supervisory functions (e.g., for joining and departing from wireless networks, etc.).

Certain aspects of the present disclosure support allowing APs 104 to schedule STAs 106 transmissions in optimized ways to improve efficiency. Both high efficiency wireless (HEW) stations, stations utilizing an 802.11 high efficiency protocol, and stations using older or legacy 802.11 protocols, may compete for access to a wireless medium. The high-efficiency 802.11 protocol described herein may allow for devices to operate under a modified mechanism that utilizes one or more of a plurality of transmitted and/or received frame types to selectively provide coexistence, and bandwidth selection for both uplink and downlink frequency division multiple access (FDMA) communications.

In some implementations, wireless devices use FDMA techniques to communicate over the medium. For example, in one implementation, a first device can communicate using a first subset of available bandwidth, while a second device can communicate using a second subset of available bandwidth. Although channels, sub-channels, available bandwidth, and subsets thereof, are generally depicted herein as contiguous, a person having ordinary skill in the art will appreciate that the terms used herein can also encompass contiguous frequencies, interleaved frequencies, sets of adjacent or non-adjacent tones with or without frequency hopping, etc.

Figure 3:
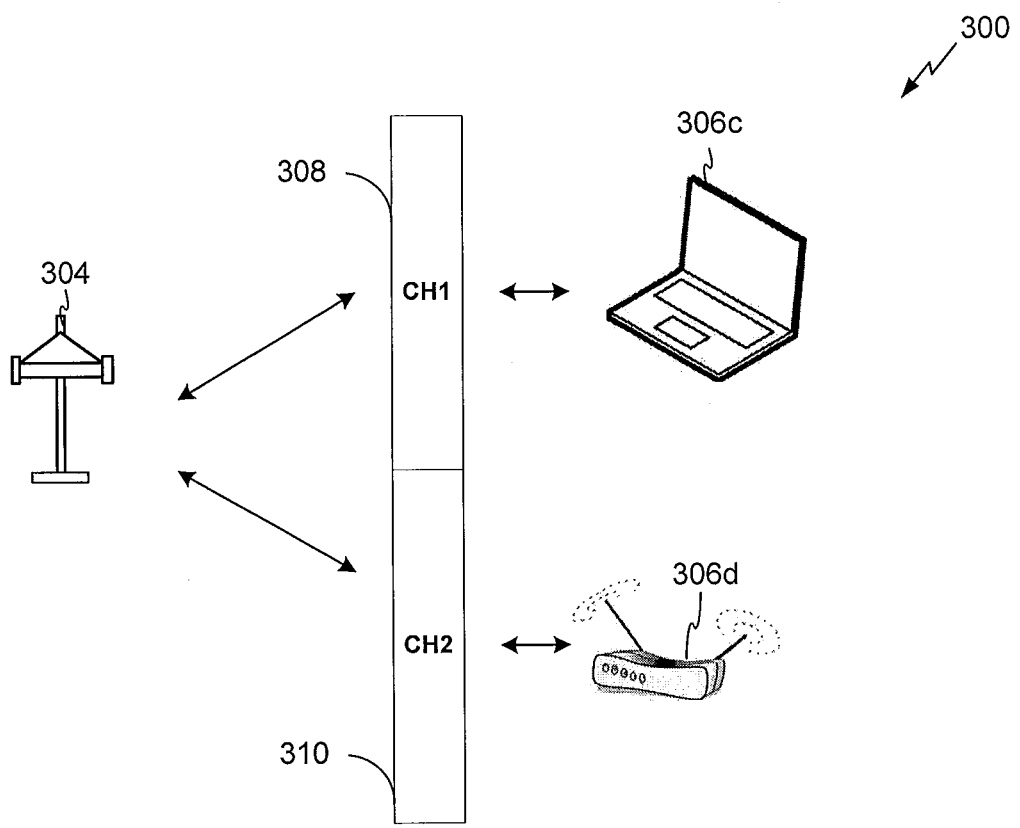
FIG. 3 shows a functional block diagram of an exemplary wireless device that may be employed within the wireless communication systems of FIG. 1.

FIG. 3 shows frequency multiplexing techniques that may be employed within the wireless communication system 100 of FIG. 1. As illustrated in FIG. 3, an AP 304 as well as an STA 306c and an STA 306d may be present within a wireless communication system 300. Although only two STAs are shown for simplicity of illustration, the present application is not so limited and any number of STAs may be included in the wireless communication system 300. Furthermore, although the STAs 306c and 306d are shown as a laptop and wireless router, respectively, the present application is not so limited and the STAs 306c and 306d may be any wireless station device without limitation. An available bandwidth of the communication medium may be set by a licensing body, a standards body, or preset or detected by a device. For example, in an 802.11 standard, an available bandwidth can be 80 MHz. Under a legacy 802.11 protocol, each of the AP 304 and STAs 306c and 306d attempt to communicate using the entire bandwidth, which can reduce throughput. In some instances, the AP 304 may reserve the entire bandwidth while actually communicating only on a subset of available bandwidth. For example, a legacy channel can have a 20 MHz bandwidth. However, under the high-efficiency 802.11 protocol using FDMA, the bandwidth may be divided into a plurality of sub-channels. In the illustrated implementation of FIG. 3, the available bandwidth may be divided into a plurality of segments, for example two segments 308 and 310 (e.g., channel 1 and channel 2, respectively). The AP 304 may be associated with each of segments 308 and 310, while the STA 306c may be associated with segment 308 and the STA 306d may be associated with the segment 310. In various implementations, the sub-channels can be between about 1 MHz and 40 MHZ, between about 2 MHz and 10 MHz, and more particularly about 5 MHz. As discussed above, sub-channels can be contiguous or non-contiguous (for example, interleaved).

In an implementation, the AP 304 and the STAs 306c and 306d may communicate using a portion of or the entire frequency spectrum of the medium. For example, the STA 306c may communicate using the segment 308, while the STA 306d may communicate using the segment 310. Because the segments 308 and 310 are different portions of the communication medium, a first transmission using the first segment would not interfere with a second transmission using the second segment. Accordingly, the throughput of the wireless communication system 300 may be increased. As such, the AP 304 and the STAs 306c and 306d may experience reduced latency and increased network throughput even as the number of active wireless devices increases, thereby improving user experience. A communicating device may utilize clear to send to self frames (CTS to self frames), for example, to protect or reserve a particular channel for communication for downlink FDMA communications, as will be described in more detail below in connection with FIG. 4.

Figure 4:
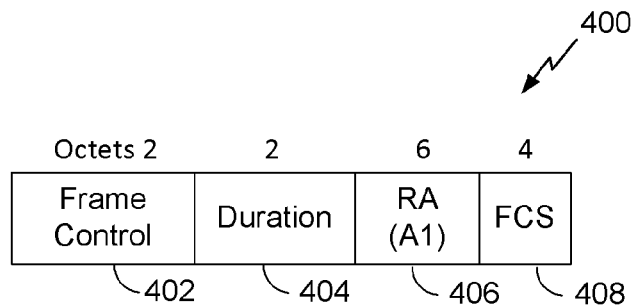
FIG. 4 illustrates an example of a clear to send (CTS) frame.

FIG. 4 illustrates an example of a CTS frame. The CTS frame 400 may be transmitted by a device to reserve a channel for communication. The CTS frame 400 includes 4 different fields: a frame control (FC) field 402, a duration field 404, a receiver address (RA) field 406 (also referred to as a receiver address (a1)), and a frame check sequence (FCS) field 408. FIG. 4 further indicates the size in octets of each of the fields 402, 404, 406 and 408 as 2, 2, 6 and 4, respectively. The RA field 406 includes a full media access control (MAC) address of a device, which is a 48-bit (6 octet) value. The MAC address in the RA field 406 corresponds to the device the CTS frame is intended to be received by. All devices to which the CTS frame 400 is not addressed and that are able to decode the CTS frame 400, will remain silent for the duration indicated in the duration field 404 by updating their network allocation vector (NAV) according to the value in the duration field 404. This ensures that no other devices will transmit on a particular channel during an interval defined in the duration field 404. Where the CTS frame 400 is a "CTS to self frame", the receiver address (RA) field 406 may include the MAC address of the device transmitting the CTS frame and will result in a reservation of the channel for the device that transmitted the CTS frame, while all other devices will remain silent for the single time interval indicated in the duration field 404.

Figure 5:
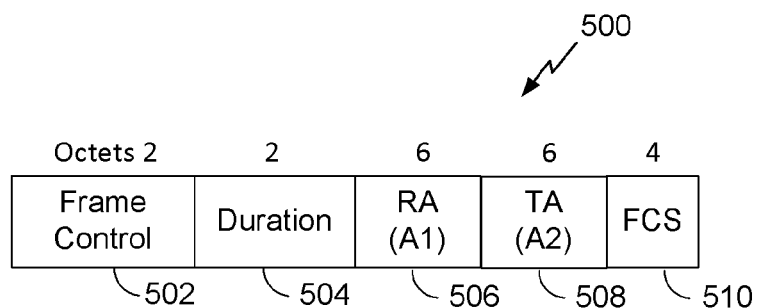
FIG. 5 illustrates an example of a request to send (RTS) frame.

FIG. 5 illustrates an example of a request to send (RTS) frame. The RTS frame 500 includes 5 different fields: a frame control (FC) field 502, a duration field 504, a receiver address (RA) field 506 (also referred to as a receiver address (a1)), a transmitter address (TA) field 508 (also referred to as a receiver address (a2)), and a frame check sequence (FCS) field 510. FIG. 5 further indicates the size in octets of each of the fields 502, 504, 506, 508 and 510 as 2, 2, 6, 6 and 4, respectively. Both of the RA field 506 and the TA field 508 include a full MAC address of a device, which is a 48-bit (6 octet) value. The MAC address in the RA field 505 corresponds to the device receiving the RTS frame 500, while the TA field 508 corresponds to the device transmitting the RTS frame 500. A wireless device wishing to send data may initiate the process by sending the RTS frame 500. The receiving wireless device may reply with a CTS frame, such as the CTS frame 400 of FIG. 4, to confirm the request to send data. Any other node receiving the RTS frame 500 or the CTS frame 400 will refrain from sending data for an interval of time indicated in the duration field 504.

Figure 6:
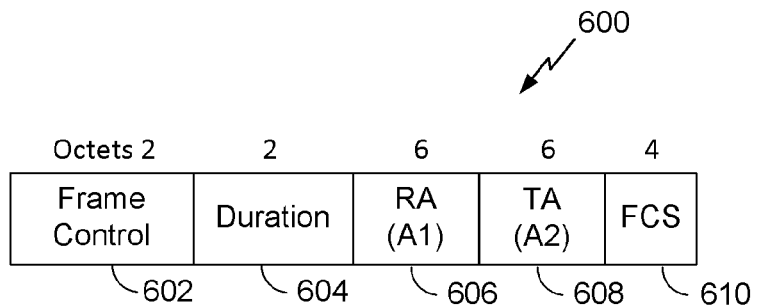
FIG. 6 illustrates an example of a contention free end (CF end) frame.

FIG. 6 illustrates a contention free end (CF end) frame 600. The CF end frame 600 may be transmitted by a device signaling the end of a contention free period. Thus, the CF end frame 600 may be used to cancel a reservation made in response to a network allocation vector (NAV), for example, the CTS frame 400 of FIG. 4 and/or the RTS frame 500 of FIG. 5. Any receiver receiving the CF end frame 600 may cancel any NAV reservations that have previously been set. The CF end frame 600 includes 4 different fields: a frame control (FC) field 602, a duration field 604, a receiver address (RA) field 606 (also referred to as a receiver address (a1)), a transmitter address (TA) field 608 (also referred to as a transmitter address (a2)), and a frame check sequence (FCS) field 610. FIG. 6 further indicates the size in octets of each of the fields 602, 604, 606, 608 and 610, as 2, 2, 6, 6, and 4, respectively. The duration field 604 may be set by the generating STA to 0 to indicate the completion of the transmission opportunity (TXOP) (i.e., set the NAV of the receiving STAs to 0). Each of the RA and TA fields 606, 608 comprises a full MAC address of a device, which is a 48-bit (6 octet) value. Thus, all devices that can decode the CF end frame 600 listening on the communication channel previously silenced for the duration of either the CTS frame 400 or the RTS frame 500, for example, will be able to communicate on the communication channel again.

Figure 7:
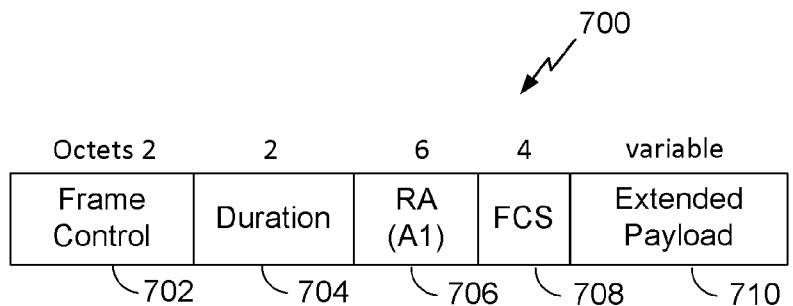
FIG. 7 illustrates an example of a trigger frame.

FIG. 7 shows an example trigger frame 700 that can be employed within the wireless communication system of FIG. 1. In the illustrated embodiment, the trigger frame 700 includes a frame control field 702, a duration field 704, a receive address field 706, a frame check sequence (FCS) 708, and an extended payload 710. As shown, the frame control field 702 is two bytes long, the duration field 704 is two bytes long, the receive address 706 is two bytes long, the FCS 708 is two bytes long, and the extended payload 710 is a variable length. In various embodiments, the trigger frame 700 can omit one or more fields shown in FIG. 7 and/or include one or more fields not shown in FIG. 7, including any of the fields discussed in any other FIG. herein. A person having ordinary skill in the art will appreciate that the fields in the trigger frame 700 can be of different suitable lengths, and can be in a different order. In particular, the extended payload 710 can be omitted. In such implementations, the trigger frame 700 may be a clear-to-send frame.

In various embodiments, the extended payload 710 can include an identifier of STAs that are eligible to transmit via UL-FDMA at a time after the trigger frame is received, an indication of a power at which the STAs 506A-506E should transmit, an indication of the channel(s) and/or bandwidth the STAs 506A-506E should use to transmit, specific channel assignments, and/or a synchronization indication. In various embodiments, the time after the trigger frame can include a short inter-frame spacing (SIFS), a point coordinate function inter-frame spacing (PIFS), or a time longer than PIFS.

In an embodiment, the trigger frame 700 can include an indication that the trigger frame 700 includes an extended CTS frame including the extended payload 710. For example, the trigger frame 700 can set one or more bits normally reserved in control frames to indicate the presence of the extended payload 710.

In some embodiments, the trigger frame 700 can omit the extended payload 710 and/or include a control wrapper frame indicating the presence of a high-throughput control (HTC) field. The HTC field may provide four bytes that can be used to embed identifiers of target STAs information. The trigger frame 700 may be referred to as a clear to multiplex frame, an extended CTS frame, or a clear to transmit (CTX) frame.

In another implementation, the trigger frame 700 can have a same format (compatible format) as a CF-Poll frame as defined in 802.11 or a Synch frame as defined in 802.11ah. Poll frames can include a multicast receiver address. In various implementations, the trigger frame 700 can include one or more of the following indications: a deferral time for third party STAs, an identifier of STAs that are eligible to transmit via UL-FDMA at one certain time (for example, a short inter-frame space (SIFS), a point coordination function (PCF) inter-frame space (PIFS), or longer) after the trigger frame, an indication of a power at which a STA should transmit, an indication of the channel(s) and/or bandwidth the STA should use to transmit, channel assignments for one or more STAs, a synchronization indication, an acknowledge (ACK) policy indication for one or more STAs, an exact or maximum duration of the data transmission, etc. The identifier of STAs that are eligible to transmit can include a list of addressed (e.g., MAC addressed, AIDs, partial or hashed AIDs, etc.) and/or one or more group identifiers. The group identifier can include, for example, a multicast MAC address previously associated to a group of STAs and communicated to the STAs, or a group identifier previously defined and communicated to the STAs. The transmit power indicator can include, for example, an absolute power indicator or an indication of a back-off from a STA nominal transmit power, which the STA can indicate. In various implementations, one or more of the aforementioned payload elements can be negotiated or predetermined between each STA and the AP. The payload elements can be included in an extended payload, or distributed in other fields.

FIG. 8A shows a timing diagram in which aspects of the present disclosure may be employed. As illustrated in FIG. 8A, two channels are present: channel 1 (i.e., CH1) and channel 2 (i.e., CH2). As used herein, CH1 is referred to as a primary frequency channel (e.g., a default channel used by STAs operating on the regular IEEE 802.11 protocol) and CH2 is referred to as a secondary frequency channel. In some implementations, legacy STAs can only transmit on secondary frequency channels in combination with transmission on the primary frequency channel. In contrast, high efficiency wireless (HEW) STAs can transmit packets on secondary frequency channels without including the primary frequency channel. The channels CH1 and CH2 may be contiguous (e.g., each channel covers consecutive 20 MHz frequency ranges, such as from 1000 MHz to 1080 MHz) or non-contiguous (e.g., there are gaps in frequency between the channels). Although two channels are shown for simplicity of illustration in the following figures, the present application is not so limited and any number of channels may be present.

As shown in FIG. 8A, an AP (e.g., the AP 304 of FIG. 3) may transmit a downlink (DL) transmission 810b (FDMA PPDU) to STA1 on the secondary frequency channel CH2 and transmit a DL transmission 810a (FDMA PPDU) to STA2 on the primary frequency channel CH1. Typically, the STA1 and the STA2 may each acknowledge the respective DL transmission by transmitting a UL ACK or a Block ACK back to the AP. Each of the STA1 and the STA2 may additionally respond with UL data. Such UL transmissions are shown as UL STAn BAs or Data 820a and 820b. In order to protect both of the DL transmissions 810a and 810b as well as the UL transmissions 820a and 820b, the AP may send a CTS frame which will set the NAV for the entire bandwidth used for transmission and for a single time interval 830a that will cover both the DL transmissions 810a and 810b as well as the UL transmissions 820a and 820b. The AP may accomplish this by sending a CTS to self frame 802a on the primary frequency channel CH1 and a duplicated CTS to self frame 802b on the secondary frequency channel CH2 before transmitting the DL transmissions 810a and 810b, each CTS to self frame having a duration field set to a value that will extend from the CTS to self frame to at least the end of the UL STAn BAs or Data 820a and 820b. In this way, the AP may protect both the DL and UL transmission on each of the channels CH1 and CH2.

FIG. 8A shows an implementation where the NAV is set for the same single time interval 830a on each of the primary frequency channel CH1 and the secondary frequency channel CH2. However, in some implementations, it may be desirable to set the NAV for different durations on a per-channel basis. Such an implementation may be shown by FIG. 8B. FIG. 8B shows a timing diagram in which aspects of the present disclosure may be employed. In FIG. 8B, all aspects are as described with respect to FIG. 8A above, except that the AP may send duplicated CTS to self frames 802a and 802b on the primary frequency channel CH1 and secondary frequency channel CH2, respectively, each having a different duration indicated in the duration field. For example, the AP may transmit the CTS to self frame 802a indicating a first single time interval 830a, which extends from the CTS to self frame 802a to at least the end of the UL STAn BAs or Data transmission 820a. The AP may likewise transmit the CTS to self frame 802b indicating a second single time interval 830b, which extends from the CTS to self frame 802b to at least the end of the UL STAn BAs or Data transmission 820b. In this way, the AP may protect both the DL and UL transmission on each of the channels CH1 and CH2 for durations determined on a per-channel basis.

Figure 8C:
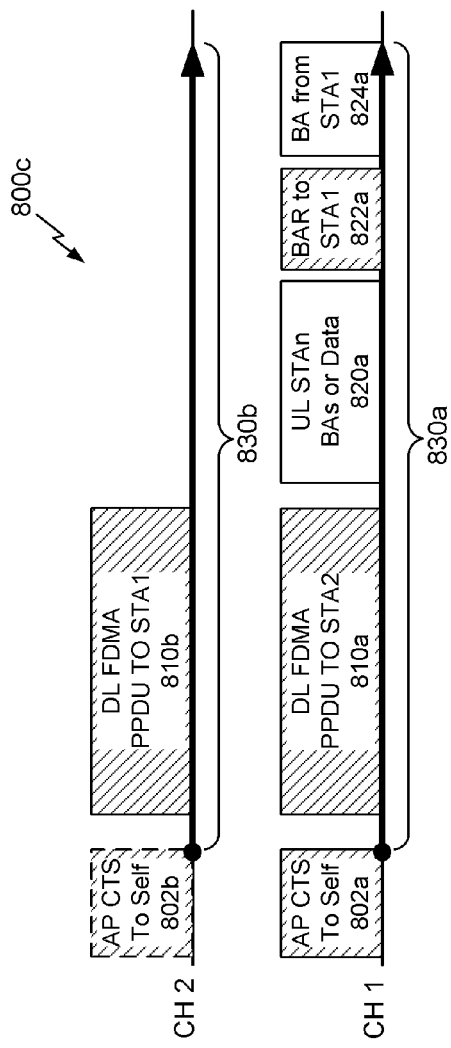

In some implementations, it may be desirable to protect transmissions occurring on the primary frequency channel only. Such an implementation may be shown by FIG. 8C. FIG. 8C shows a timing diagram in which aspects of the present disclosure may be employed. In FIG. 8C, all aspects are as described with respect to FIG. 8A above, except that the STA1 on the secondary frequency channel CH2 may not send any UL transmissions on the secondary frequency channel in response to the DL FDMA PPDU to STA1 810b. Instead, after the STA2 transmits the UL STAn BAs or Data 820a on the primary frequency channel CH1, the AP may transmit a block ACK request 822a addressed to the STA1 on the primary frequency channel CH1. The STA1 may respond by transmitting a block ACK back to the AP on the primary frequency channel CH1. There are two options contemplated for the implementation shown in FIG. 8C. In the first, duplicated CTS to self frames 802a and 802b are transmitted on the primary frequency channel CH1 and on the secondary frequency channel CH2, respectively, each having indicating the same single time interval 830a in their duration fields. Thus, in the first option, the CTS to self frame 802b may provide a period free of transmissions on the secondary frequency channel CH2 where there are no further transmissions after the DL FDMA PPDU to STA1 810b. In a second option, the AP may only transmit the CTS to self frame 802a on the primary frequency channel CH1 and not transmit the CTS to self frame 802b (as shown by the dashed box). This may be a satisfactory solution for protecting any transmissions on the secondary frequency channel CH2 because any transmissions from other STAs that could potentially cause interference would include the primary frequency channel, and the primary frequency channel has already been protected by the CTS to self frame 802a.

Figure 8D:
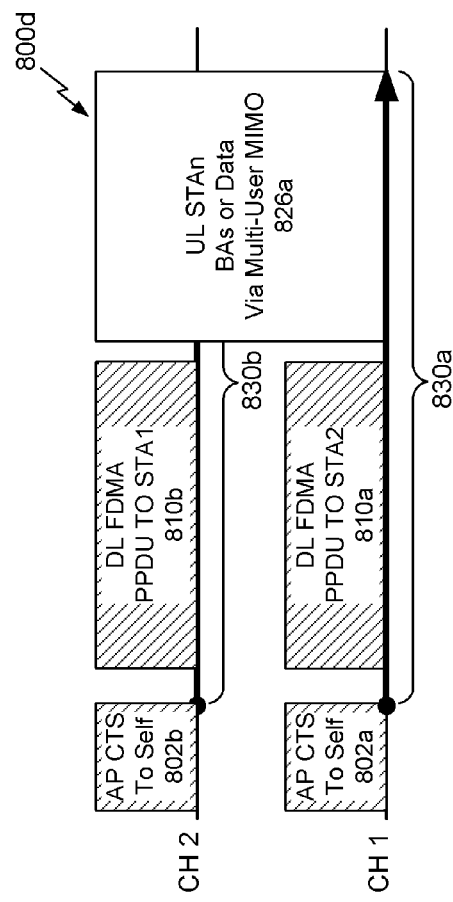

The above implementations may additionally be utilized to protect multi-user MIMO UL transmissions. Such an implementation may be shown by FIG. 8D. FIG. 8D shows a timing diagram in which aspects of the present disclosure may be employed. In FIG. 8D, all aspects and functionality are as described with respect to FIG. 8A above, except that the UL STAn BAs or Data transmission 820a and the UL STAn BAs or Data transmission 820b are transmitted in a multi-user MIMO configuration as shown by the UL STAn BAs or Data via Multi-User MIMO 826a. In this way, the AP may protect both the DL and UL transmission on each of the channels CH1 and CH2 for the same single time interval 830a.

Figure 9A:
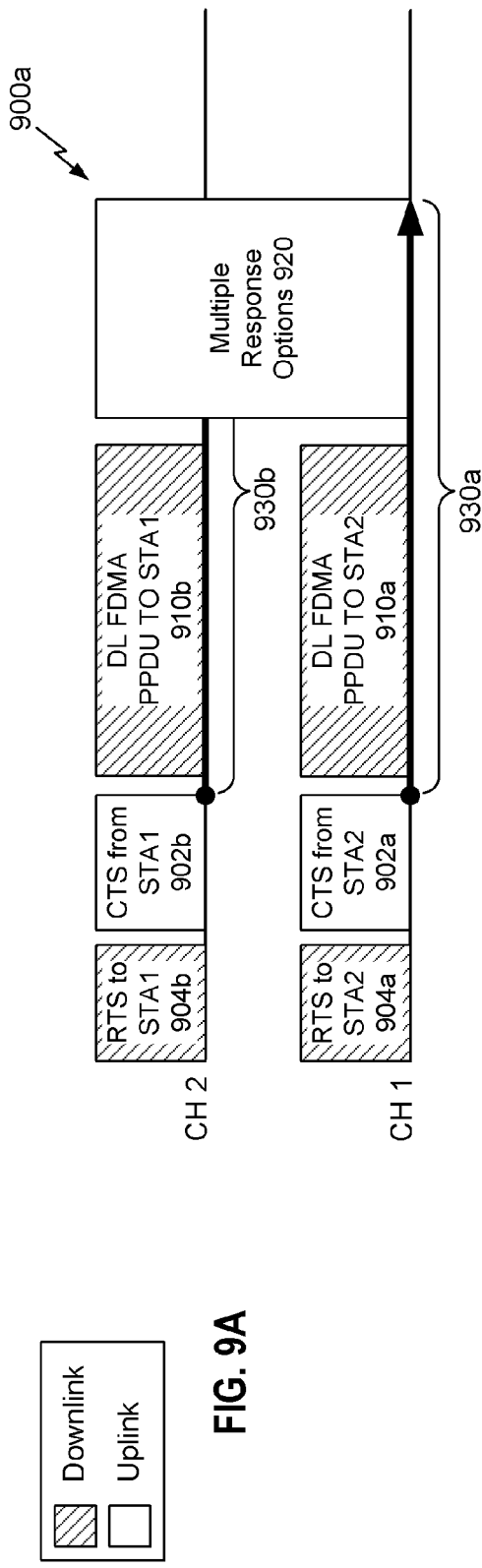

In the implementations previously described with respect to FIGS. 8A-8D, the AP sends a CTS to self frame in order to protect the DL and UL transmissions. However, because confirmation of the reservation is not received from the receiver side, e.g., from the wireless STAs themselves, such implementations may not be as robust as desired. Thus, in some implementations according to FIGS. 9A-9D, confirmation and reservation of the medium may be received from the wireless STAs themselves. FIG. 9A shows another timing diagram in which aspects of the present disclosure may be employed. As shown in FIG. 9A, the AP may instead concurrently transmit a request to send (RTS) frame 904a to the STA2 on the primary frequency channel CH1 and a RTS frame 904b to the STA1 on the secondary frequency channel CH2. Each of the RTS frames 904a and 904b may indicate durations in their duration fields that will be long enough to reserve each of the primary frequency channel CH1 and secondary frequency channel CH2 for at least the single time interval 930a of the DL and UL transmissions. FIG. 9A shows the DL transmission on the primary frequency channel CH1 as DL FDMA PPDU to STA2 910a and the DL transmission on the secondary frequency channel CH2 as DL FDMA PPDU to STA2 910b. In addition, FIG. 9A shows the UL transmission as Multiple Response Options frame 920, which may be understood to include any of the UL transmission options previously described in connection with FIGS. 8A-8D. In response to receiving the RTS frame 904a, the STA2 may transmit a CTS frame 902a, which may include, in its duration field, the duration indicated in the RTS frame less the time required to receive the RTS frame and to transmit the CTS frame. Thus, the CTS frame 902a may act as a confirmation of the reservation of the primary frequency channel CH1 requested in the RTS frame 904a. Similarly, in response to receiving the RTS frame 904b, the STA1 may transmit a CTS frame 902b, which may include, in its duration field, the duration indicated in the RTS frame less the time required to receive the RTS frame and to transmit the CTS frame. Thus, the CTS frame 902b may act as a confirmation of the reservation of the secondary frequency channel CH2 requested in the RTS frame 904b. Thus, DL transmissions 910a and 910b as well as any of the multiple UL response options 920 may be protected for the single time interval 930a.

Figure 9B:
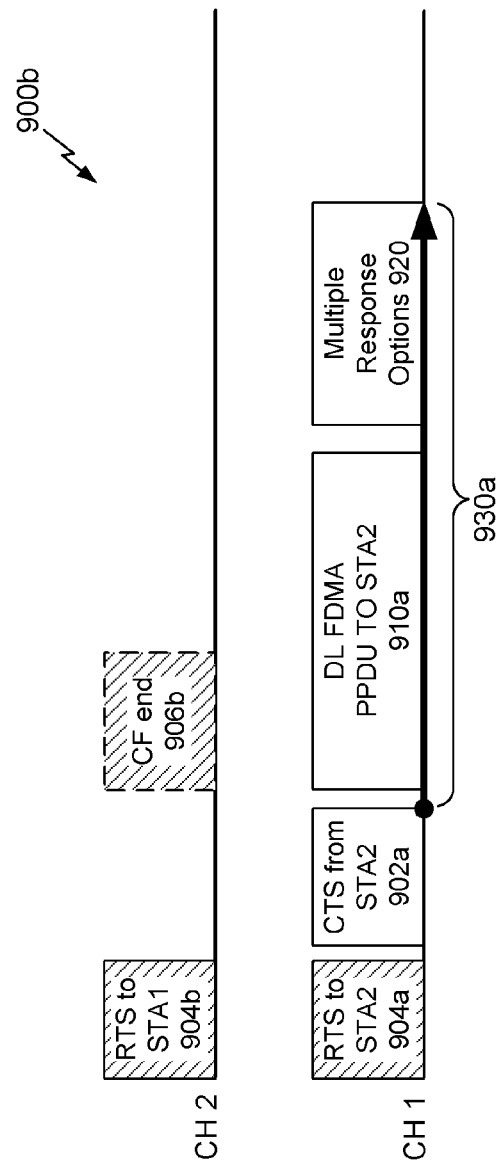

The implementation previously described in connection with FIG. 9A pertains to situations where each of the STA1 and STA2 respond by sending an individual CTS frame. However, there may be situations where a particular channel is not available to a particular STA for some reason. Such situations may be described in more detail with respect to FIG. 9B. FIG. 9B shows another timing diagram in which aspects of the present disclosure may be employed. As in FIG. 9A, the AP may concurrently transmit the RTS frame 904a to the STA2 on the primary frequency channel CH1 and the RTS frame 904b to the STA1 on the secondary frequency channel CH2. However, in this implementation, only the STA2 may respond by transmitting the CTS frame 902a on the primary frequency channel CH1, while the STA1 may not transmit a CTS frame on the secondary frequency channel CH2. This may indicate that the secondary frequency channel CH2 is not available to the STA1 at the time the RTS frame 904b was transmitted. Thus, by sending an RTS frame and listening for a response CTS frame, the AP may carry out bandwidth probing of the network in order to determine whether particular STAs are configured or able to communicate over particular channels utilizing FDMA. Since the STA2 responds to the RTS frame 904a with the CTS frame 902a on the primary frequency channel CH1, the subsequent transmission of the DL FDMA PPDU to STA2 910a and the UL transmission including the multiple response options 920 may be protected for the single time interval 930a. By contrast, since the AP did not receive a response CTS frame from the STA1 on the secondary frequency channel CH2, the AP may determine that the STA1 is not currently compatible with communication on the secondary frequency channel CH2. Accordingly, the AP may optionally transmit a CF end frame 906b in order to ensure clearance of the NAV originally set by the transmission of the RTS frame 904b. However, in some implementations, the AP need not send the CF end frame 906b due to the fact that some wireless standards provide that a wireless device may ignore a NAV set by an RTS frame where subsequent data is not received.

FIG. 9B disclosed an implementation where the CTS frame was received on the primary frequency channel CH1 but not on the secondary frequency channel CH2. By contrast, FIG. 9C discloses an implementation where the CTS frame is received on the secondary frequency channel CH2 but not on the primary frequency channel CH1. FIG. 9C shows another timing diagram in which aspects of the present disclosure may be employed. In FIG. 9C, the AP may concurrently transmit the RTS frame 904a to the STA2 on the primary frequency channel CH1 and the RTS frame 904b to the STA1 on the secondary frequency channel CH2. However, in this implementation, only the STA1 may respond by transmitting the CTS frame 902b on the secondary frequency channel CH2, while the STA2 may not transmit a CTS frame on the primary frequency channel CH1. In such a case, because the reservation on the primary frequency channel CH1 was not confirmed, the AP may not transmit any DL data and may clear the NAV for the entire medium by sending a CF end frame 906b over the secondary frequency channel CH2. Optionally, the AP may also send a CF end frame 906a over the primary frequency channel CH1 to ensure clearance of the NAV for the primary frequency channel. However, this may not be necessary because no CTS frame was received confirming the prior reservation by the RTS frame 904a on the primary frequency channel CH1.

FIG. 9D shows another timing diagram in which aspects of the present disclosure may be employed. FIG. 9D discloses another implementation where the CTS frame is received on the secondary frequency channel CH2 but not on the primary frequency channel CH1. However, contrary to the disclosure according to FIG. 9C where the AP refrains from transmitting, the AP may instead proceed with transmissions on the secondary frequency channel CH2. For example, the AP may concurrently transmit the RTS frame 904a to the STA2 on the primary frequency channel CH1 and the RTS frame 904b to the STA1 on the secondary frequency channel CH2. The STA1 responds by transmitting the CTS frame 902b on the secondary frequency channel CH2 and the NAV is set for the single time interval 930a. The AP may then transmit the DL FDMA PPDU to STA1 910a and subsequently the STA1 may respond with the UL transmissions multiple response options 920. However, because STAs only monitoring the primary frequency channel CH1 would sense no transmission on the primary frequency channel CH1, such STAs could potentially begin transmitting on the primary frequency channel CH1 and cause unwanted interference or collisions in the network. To alleviate this, the AP may optionally transmit a CTS to self frame 912a indicating a second single time interval 930b on the primary frequency channel CH1 in order to reserve the primary frequency channel CH1 for the rest of the single time interval 930a set by the CTS frame 902a on the secondary frequency channel CH2. In this way, the AP may guarantee that no other STA will begin transmitting on the primary frequency channel for the single time interval 930b.

Figure 10A:
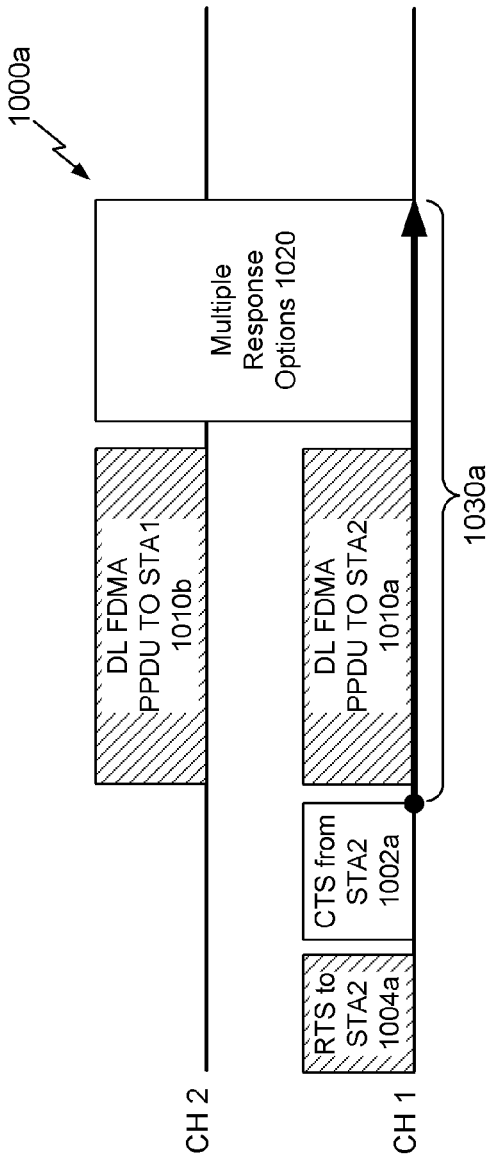
FIGS. 10A-10D show other timing diagrams in which aspects of the present disclosure may be employed.

FIG. 10A shows another timing diagram in which aspects of the present disclosure may be employed. In FIG. 10A a RTS/CTS message exchange may occur only on the primary frequency channel as a proxy for the entire bandwidth of all channels. For example, the AP may transmit a RTS frame 1004a to the STA2 on the primary frequency channel CH1. The STA2 may respond by transmitting a CTS frame 1002a. This will silence all other STAs on the primary frequency channel, reserving the primary frequency channel for the single time interval 1030a. The AP may then transmit the DL FDMA PPDU to STA2 1010a. Likewise, because reservation of the primary frequency channel CH1 may act as a proxy for reserving the secondary frequency channel CH2, the AP may also transmit the DL FDMA PPDU to STA1 1010b on the secondary frequency channel CH2. The multiple response options frame 1020 may correspond to UL data that may be transmitted from either of the STA1 or the STA2 to the AP, as previously described in connection with any of FIGS. 8A-8D. In the event the CTS frame 1002a is not received from the STA2, the AP may not send DL data on any of the channels and may be silent, as described in more detail in connection with FIG. 10B below.

Figure 10B:
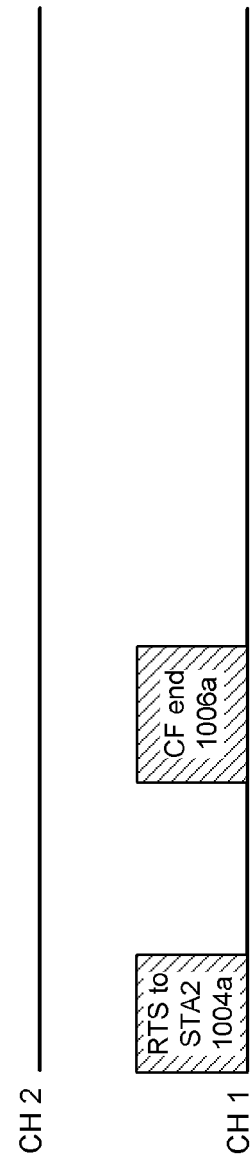

FIG. 10B shows another timing diagram in which aspects of the present disclosure may be employed. The AP may transmit the RTS frame 1004a to the STA2 on the primary frequency channel CH1. If the CTS frame 1002a is not received, the AP may transmit a CF end frame 1006b to clear the NAV previously set by the RTS frame 1004a in order to clear the primary frequency channel CH1. In this case, the AP will not transmit DL data.

Figure 10C:
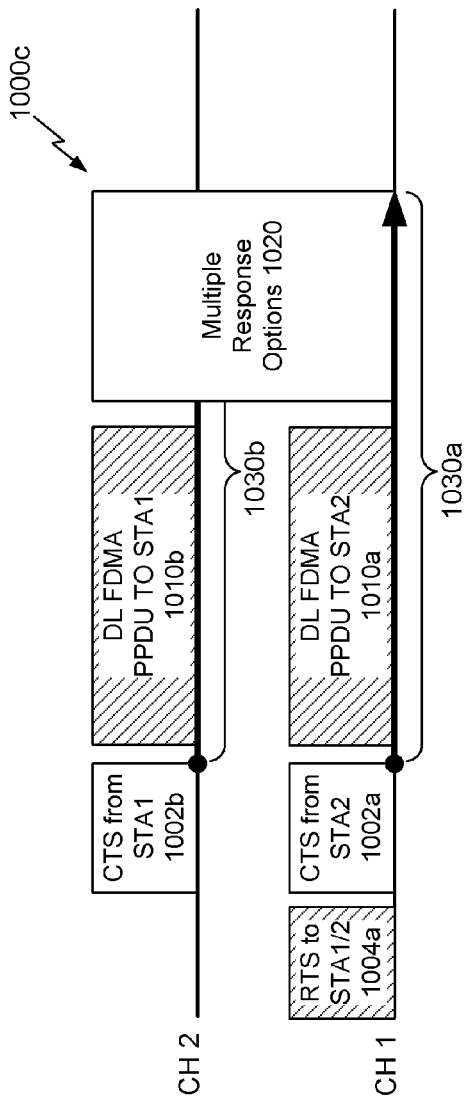

FIG. 10C shows another timing diagram in which aspects of the present disclosure may be employed. In FIG. 10C a RTS frame 1004a is transmitted only on the primary frequency channel CH1 but is addressed to both the STA1 and the STA2. This may be possible because the STA1 and the STA2 are configured to listen on the primary as well as all secondary frequency channels of the medium. In an alternative, the RTS frame 1004a may be duplicated across each of the primary and secondary frequency channels as exact copies of one another. The STA2 may respond by transmitting a CTS frame 1002a on the primary frequency channel CH1, while the STA2 may respond by transmitting a CTS frame 1002b on the secondary frequency channel CH2. This will silence all other STAs on both the primary frequency channel CH1 and the secondary frequency channel CH2, reserving the channels for the single time interval 1030a. The AP may then transmit the DL FDMA PPDU to STA2 1010a on the primary frequency channel CH1 and the DL FDMA PPDU to STA1 1010b on the secondary frequency channel CH2. The multiple response options frame 1020 may correspond to UL data that may be transmitted from the STA1 and the STA2 to the AP, as previously described in connection with any of FIGS. 8A-8D. In this way, the DL as well as UL transmissions may be protected for the single time interval 1030a. In the event the CTS frame 1002a is not received from the STA2, the AP may not send DL data on any of the channels and may be silent, as described in more detail in connection with FIG. 10D below.

Figure 10D:
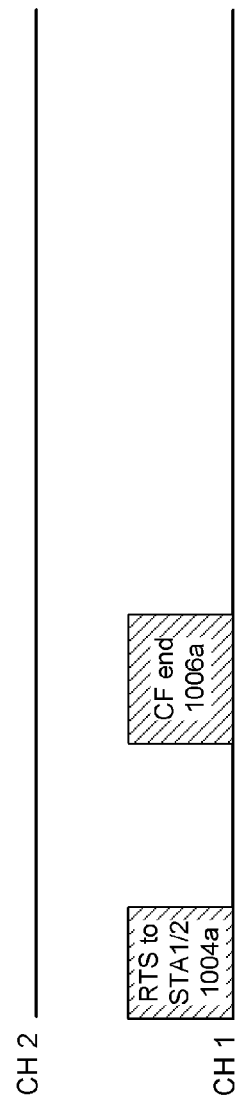

FIG. 10D shows another timing diagram in which aspects of the present disclosure may be employed. The AP may transmit the RTS frame 1004a to both the STA1 and the STA2 on the primary frequency channel CH1. If the CTS frame 1002a is not received on the primary frequency channel CH1, the AP may transmit a CF end frame 1006b on the primary frequency channel CH1 to clear the NAV previously set by the RTS frame 1004a in order to clear the primary frequency channel CH1. In this case, the AP will not transmit DL data.

Figures 11A, 11B:
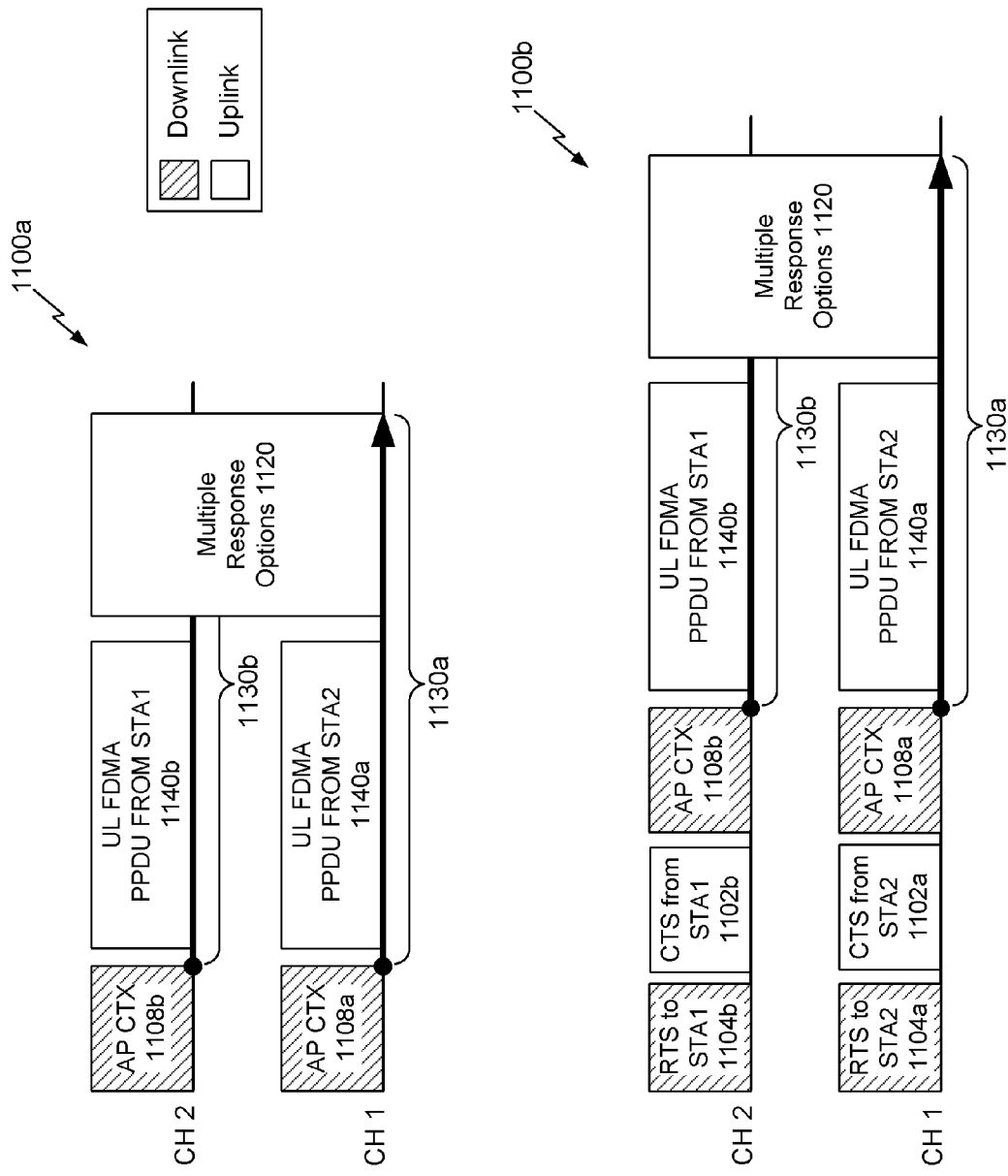
FIGS. 11A-11D show other timing diagrams in which aspects of the present disclosure may be employed.

FIG. 11A shows another timing diagram in which aspects of the present disclosure may be employed. In FIG. 11A, the AP may transmit a trigger frame (e.g., the trigger frame 700 as previously described in connection with FIG. 7) which may provide synchronization information, channel allocation information, reservation of the medium, and a trigger for the associated STAs to transmit UL data. For example, the AP may transmit a CTX frame 1108a on the primary frequency channel CH1 to the STA2 and a CTX frame 1108b on the secondary frequency channel CH2 to the STA1. In one implementation, the CTX frame 1108a may be identical to the CTX frame 1108b and each may include the allocation information for both the STA1 and the STA2. The CTX frames 1108a and 1108b may acts as a modified CTS frame such that the CTX frame 1108a also sets the NAV to reserve the primary frequency channel CH1 for the single time interval 1130a and the CTX frame 1108b also sets the NAV to reserve the secondary frequency channel CH2 for the single time interval 1130a to protect subsequent UL as well as DL transmissions between the STAs and the AP. After receiving the CTX frame 1108a, the STA 2 may transmit the UL FDMA PPDU from STA2 1140a over the primary frequency channel CH1. Likewise the STA1 may transmit the UL FDMA PPDU from STA1 1140b over the secondary frequency channel CH2. The AP may follow the UL transmissions with DL transmissions which may include DL acknowledgements and/or data, as shown by multiple response options 1120. In this way, the AP may protect the UL as well as the DL FDMA transmissions.

However, because the reservation of the medium occurs as a result of the CTX frames sent by the AP, there is no confirmation of such reservation from the receiving side (e.g., from the STAs), which may not be as robust a solution as may be desired. Thus, FIG. 11B shows another timing diagram in which aspects of the present disclosure may be employed. For example, in FIG. 11B the AP may transmit a RTS frame 1104a on the primary frequency channel CH1 to the STA2 and a RTS frame 1104b on the secondary frequency channel CH2 to the STA1. The RTS frames 1104a and 1104b may indicate durations for setting the NAV to reserve the respective channels for subsequent FDMA communication. The STA2 may respond by transmitting a CTS frame 1102a to the AP on the primary frequency channel CH1, while the STA1 may respond by transmitting a CTS frame 1102b to the AP on the secondary frequency channel CH2. The CTS frames 1102a and 1102b may provide confirmation from the receiving side (e.g., the STA side) of the respective reservations of the medium. From this point forward, the implementation shown by FIG. 11B may proceed as previously described in connection with FIG. 11A. Implementations where one of the STA1 and the STA2 do not respond with a CTS frame are described in further detail in connection with FIGS. 11C and 11D below.

Figures 11C, 11D:
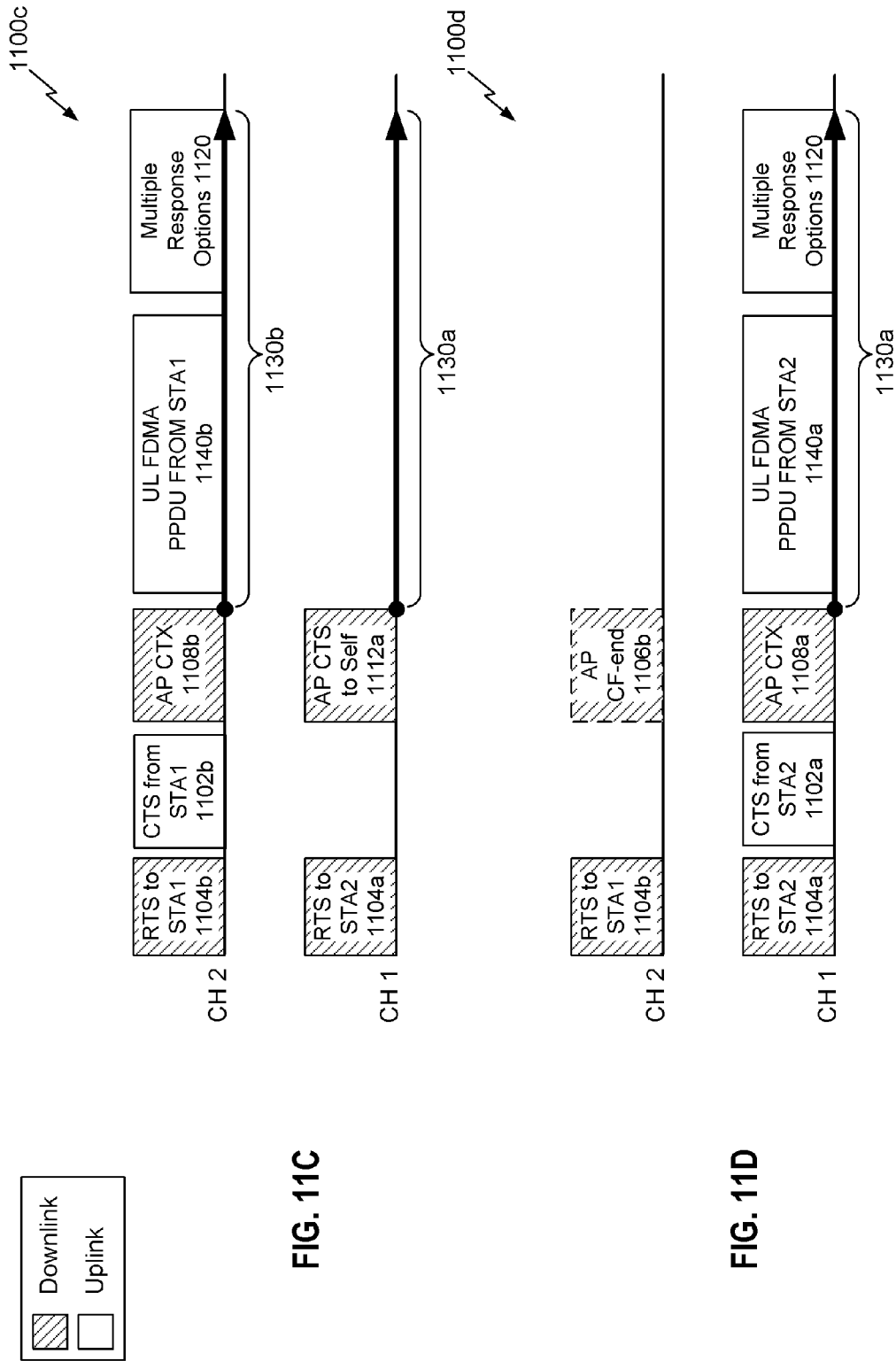

FIG. 11C shows another timing diagram in which aspects of the present disclosure may be employed. FIG. 11C describes an implementation where a CTS frame is not received by the AP in response to the RTS frame on the primary frequency channel. For example, the AP may transmit the RTS frames 1104a and 1104b as in FIG. 11B. The STA1 may respond by transmitting a CTS frame 1102b on the secondary frequency channel CH2. However, the STA2 does not send a CTS frame on the primary frequency channel CH1. In such a case, the AP may send the CTX frame 1108b to the STA1 on the secondary frequency channel, reserving the secondary frequency channel CH2 for the single time interval 1130a for subsequent UL and DL transmission as described with respect to the secondary frequency channel CH2 in FIG. 11B. However, because the AP did not receive a CTS frame on the primary frequency channel CH1, the AP may instead send a CTS to self frame 1112a on the primary frequency channel CH1 to ensure reservation of the primary frequency channel CH1 for the single time interval 1130a. This ensures that no other wireless STA, which may be monitoring only the primary frequency channel CH1, will transmit on the primary frequency channel for the single time interval 1130a.

FIG. 11D shows another timing diagram in which aspects of the present disclosure may be employed. FIG. 11D describes an implementation where a CTS frame is not received by the AP in response to the RTS frame on the secondary frequency channel. For example, the AP may transmit the RTS frames 1104a and 1104b as in FIG. 11B. The STA2 may respond by transmitting a CTS frame 1102a on the primary frequency channel CH1. However, the STA1 does not send a CTS frame on the secondary frequency channel CH2. In such a case, the AP may send the CTX frame 1108a to the STA2 on the primary frequency channel, reserving the primary frequency channel CH1 for the single time interval 1130a for subsequent UL and DL transmission as described with respect to the primary frequency channel CH1 in FIG. 11B. However, because the AP did not receive a CTS frame on the secondary frequency channel CH2, the AP may instead send a CF end frame 1106b on the secondary frequency channel CH2 to clear the secondary frequency channel CH2.

Figures 12A, 12B:
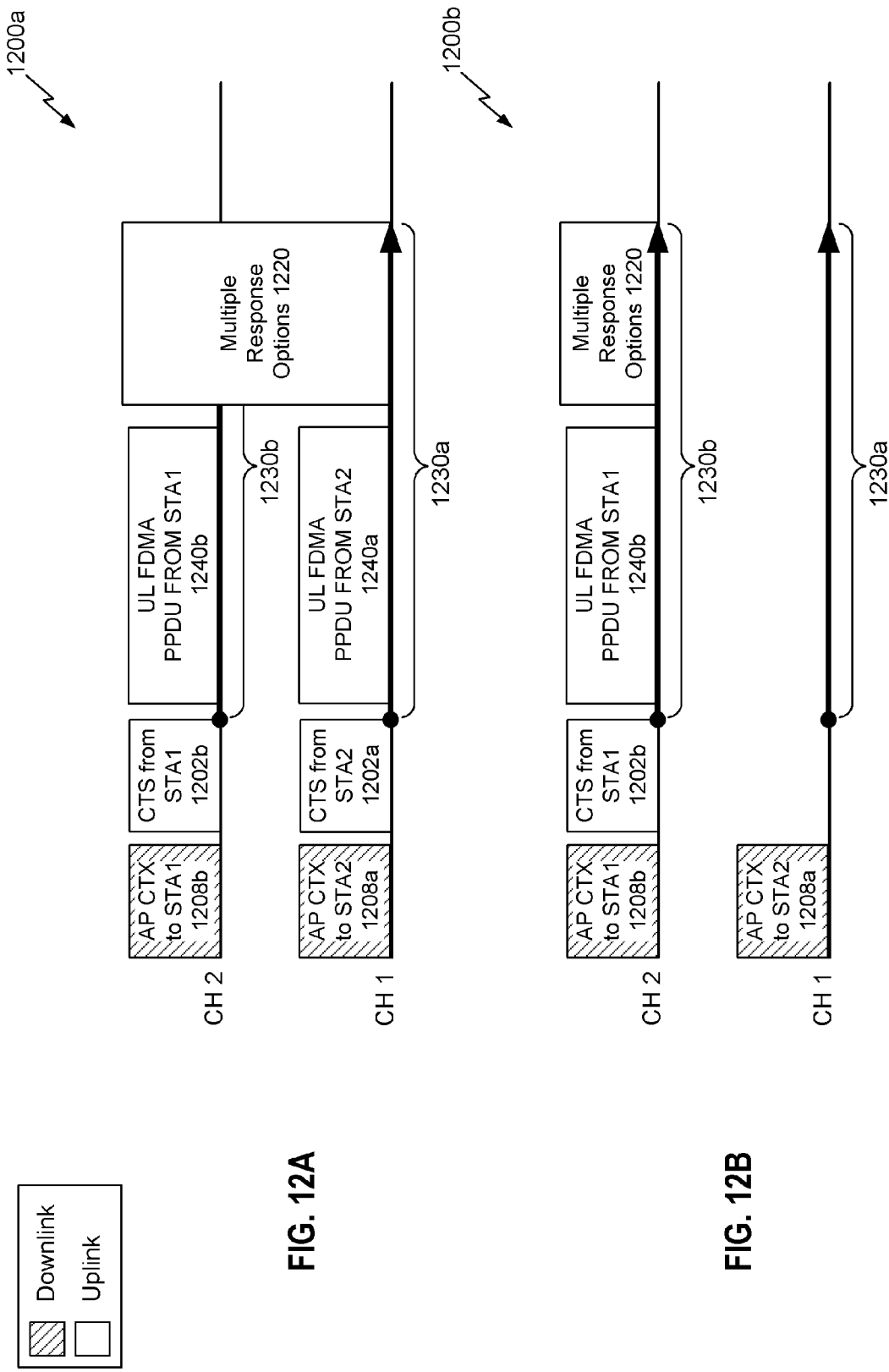
FIGS. 12A-12D show other timing diagrams in which aspects of the present disclosure may be employed.

FIG. 12A shows another timing diagram in which aspects of the present disclosure may be employed. In FIG. 12A, the AP may transmit a trigger frame (e.g., a CTX) followed by the STAs prepending UL FDMA transmissions with CTS frames confirming the CTX frames' medium reservations. For example, the AP may transmit a CTX frame 1208a on the primary frequency channel CH1 to the STA2 and a CTX frame 1208b on the secondary frequency channel CH2 to the STA1. The CTX frames 1208a and 1208b may further include an indication for the receiving STA to transmit a CTS frame confirming the CTX frames' reservations before transmitting UL FDMA data. In one implementation, the CTX frame 1208a may be identical to the CTX frame 1208b and each may include the allocation information for both the STA1 and the STA2. The CTX frames 1208a and 1208b may act as modified CTS frames such that the CTX frame 1208a also sets the NAV to reserve the primary frequency channel CH1 for the single time interval 1230a and the CTX frame 1208b also sets the NAV to reserve the secondary frequency channel CH2 for the single time interval 1230a to protect subsequent UL as well as DL transmissions between the STAs and the AP. After receiving the CTX frame 1208a, the STA 2 may transmit a CTS frame 1202a confirming the reservation of the primary frequency channel CH1 by the CTX frame 1208a followed by the UL FDMA PPDU from STA2 1240a. Likewise the STA1 may transmit a CTS frame 1202b confirming the reservation of the primary frequency channel CH2 by the CTX frame 1208b followed by the UL FDMA PPDU from STA1 1240b over the secondary frequency channel CH2. The AP may follow the UL transmissions with DL transmissions which may include DL acknowledgements and/or data, as shown by multiple response options 1220. In this way, the STA1 and the STA2 may confirm the reservation of the medium made by the AP to protect the UL as well as the DL FDMA transmissions.

FIG. 12B shows another timing diagram in which aspects of the present disclosure may be employed. FIG. 12B describes an implementation where a CTS frame is not received by the AP in response to the CTX frame on the primary frequency channel. For example, the AP may transmit the CTX frames 1204a and 1204b as in FIG. 12A. The STA1 may respond by transmitting a CTS frame 1202b on the secondary frequency channel CH2. However, the STA2 does not send a CTS frame on the primary frequency channel CH1. In such a case, the CTX frames reserve the medium for the single time interval 1230a for subsequent UL and DL transmission on the secondary frequency channel CH2, as described with respect to the secondary frequency channel CH2 in FIG. 12A. However, because the STA2 was unavailable to send a CTS frame on the primary frequency channel CH1, the primary frequency channel CH1 will remain unused for the single time interval 1230a for which it was reserved by the CTX frame 1208a.

Figures 12C, 12D:
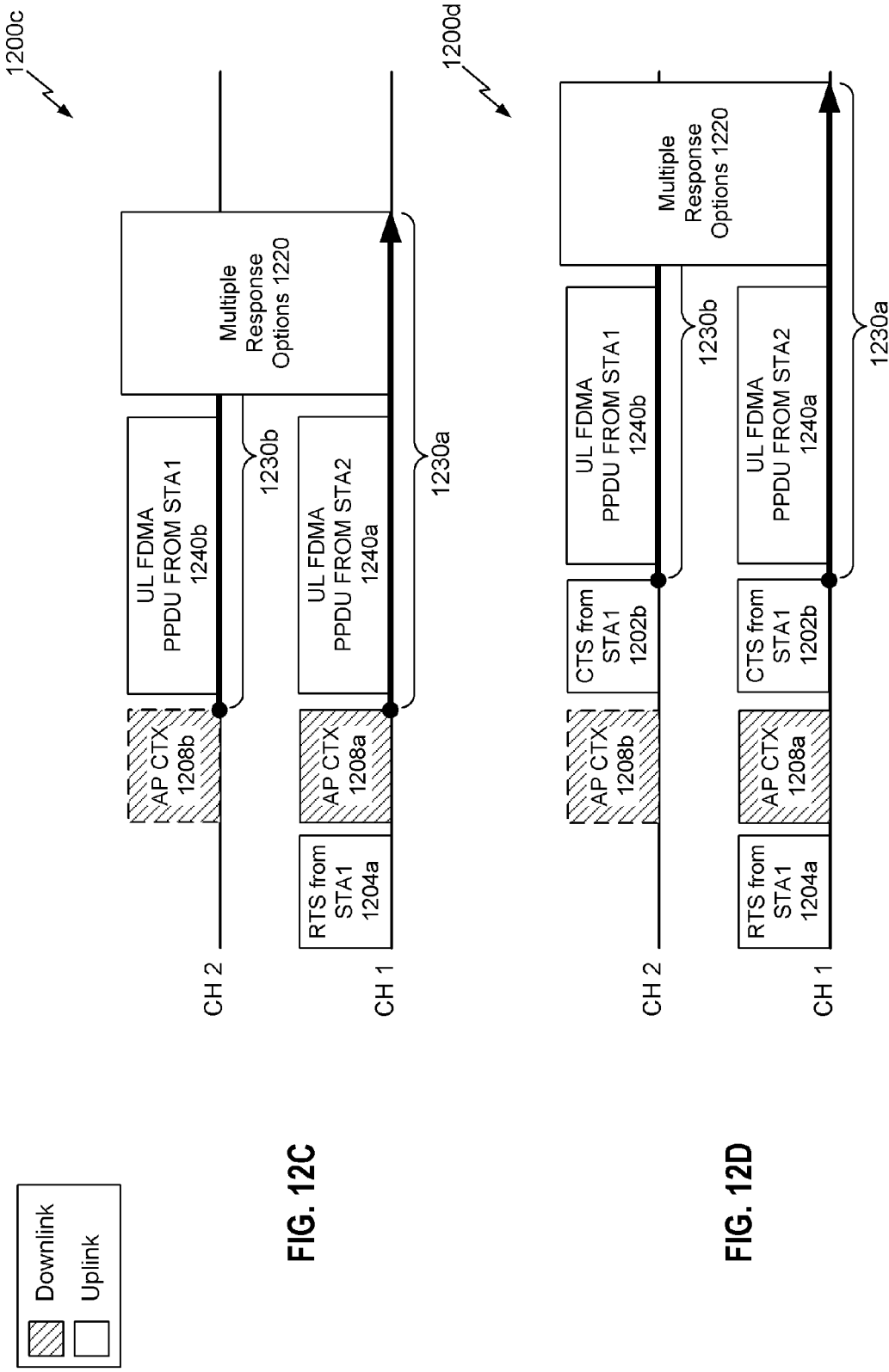

FIG. 12C shows another timing diagram in which aspects of the present disclosure may be employed. FIG. 12C describes an implementation where the STA, rather than the AP, initiates the frame exchange. For example, the STA1 may transmit an RTS frame 1204a to the AP on the primary frequency channel CH1. The AP may respond by transmitting a CTX frame 1208a to the STA1 over the primary frequency channel CH1. The AP may optionally transmit a CTX frame 1208b to the STA2 over the secondary frequency channel CH2. The CTX frames 1208a and 1208b may act as modified CTS frames such that the CTX frame 1208a also sets the NAV to reserve the primary frequency channel CH1 for the single time interval 1230a and the CTX frame 1208b also sets the NAV to reserve the secondary frequency channel CH2 for the single time interval 1230a to protect subsequent UL as well as DL transmissions between the STAs and the AP. After receiving the CTX frame 1208a, the STA 2 may transmit the UL FDMA PPDU from STA2 1240a. Likewise the STA1 may transmit the UL FDMA PPDU from STA1 1240b over the secondary frequency channel CH2. The AP may follow the UL transmissions with DL transmissions which may include DL acknowledgements and/or data, as shown by multiple response options 1220.

FIG. 12D shows another timing diagram in which aspects of the present disclosure may be employed. FIG. 12D describes an implementation where the STA, rather than the AP, initiates the frame exchange and further includes STA-side confirmation of medium reservation. For example, just as in FIG. 12C, the STA1 may transmit an RTS frame 1204a and the AP may respond by transmitting the CTX frame 1208a to STA1 over the primary frequency channel CH1 and optionally the CTX frame 1208b to the STA2 over the secondary frequency channel CH2. After receiving the CTX frame 1208a, the STA2 may transmit a CTS frame 1202a confirming the reservation of the primary frequency channel CH1 by the CTX frame 1208a followed by the UL FDMA PPDU from STA2 1240a. Likewise the STA1 may transmit a CTS frame 1202b confirming the reservation of the primary frequency channel CH2 by the CTX frame 1208b followed by the UL FDMA PPDU from STA1 1240b over the secondary frequency channel CH2. The AP may follow the UL transmissions with DL transmissions which may include DL acknowledgements and/or data, as shown by multiple response options 1220. In this way, the UL transmissions may be initiated by the STA1 and the STA1 and the STA2 may confirm the reservation of the medium made by the AP to protect the UL as well as the DL FDMA transmissions.

Figure 13:
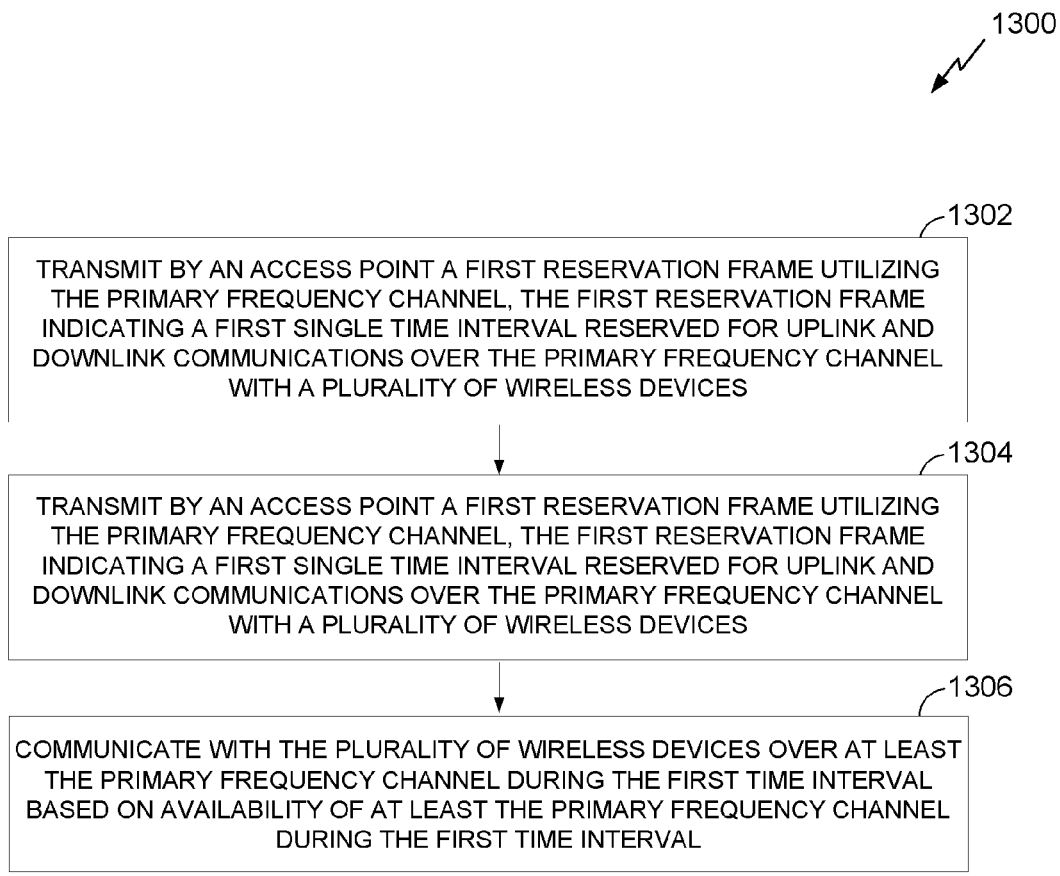
FIG. 13 shows an exemplary method of wireless communication that can be employed within the wireless communication system of FIG. 1.

FIG. 13 shows a flowchart 1300 for an exemplary method of wireless communication that can be employed within the wireless communication system 100 of FIG. 1. The method can be implemented in whole or in part by the devices described herein, such as the wireless device 202 shown in FIG. 2, which may correspond to the AP 104, as previously described in connection with FIG. 1. Specifically, the flowchart 1300 may correspond to one or more implementations previously described in connection with FIGS. 8A-12D. Although the illustrated method is described herein with reference to a particular order, in various implementations, blocks herein can be performed in a different order, or omitted, and additional blocks can be added.

Block 1302 includes transmitting by an access point a first reservation frame utilizing the primary frequency channel, the first reservation frame indicating a first single time interval reserved for uplink and downlink communications over the primary frequency channel with a plurality of wireless devices. For example, the reservation frame is shown as the CTS to self frame 802a in each of FIGS. 8A-8D, as the RTS frame 904a in each of FIGS. 9A-9D, as the RTS frame 1004a in each of FIGS. 10A-10D, as the CTX frame 1108a in any of FIGS. 11A-11D, as the RTS 1104a in any of FIGS. 11B-11D, or as the CTX frame 1208a in any of FIGS. 12A-12D. As previously described, this first reservation frame indicates a first single time interval (830a, 930a, 1030a, 1130a, 1230a) reserved for uplink and downlink communications over the primary frequency channel (CH1). The term "reserved for uplink and downlink communications" should be considered to mean a single reservation of the channel reserved for communication of data that is not necessarily limited to either uplink data or downlink data, but that is of sufficient duration and specifically reserved to potentially communicate both uplink and downlink data. The method may continue with block 1304.

Block 1304 includes transmitting by the access point a second reservation frame utilizing the secondary frequency channel, the second reservation frame indicating a second single time interval reserved for uplink and downlink communications over the secondary frequency channel with the plurality of wireless devices. For example, this second reservation frame may correspond to the CTS to self frames 802b in each of FIGS. 8A-8D, to the RTS frame 904b in each of FIGS. 9A-9D, to the CTX frame 1108b in any of FIGS. 11A-11D, to the RTS 1104b in any of FIGS. 11B-11D, or as the CTX frame 1208a in any of FIGS. 12A-12D. The second single time interval corresponds to the reservation intervals in CH2. The method may continue with block 1306.

Block 1306 includes communicating between the access point and the plurality of wireless devices over the primary frequency channel during the first single time interval and over the second frequency channel during the second single time interval. For example, FIGS. 8A-10D show combinations of downlink data, transmitted from the AP to one or more STAs, and uplink data, transmitted from one or more STAs to the AP, are transmitted within the same reserved interval on the same channel. The same is true for communications on the secondary frequency channel (CH2). Although FIGS. 11A-12D show only uplink data transmitted, such implementations are only exemplary and downlink data may also be transmitted in the illustrated reservation periods.

In some implementations, the method may further comprise receiving by the access point at least one of a confirmation frame (CTS frame 902a, 1002a, 1102a, 1202a,) over the primary frequency channel (CH1) confirming reservation of the primary frequency channel for the first single time interval, and a confirmation frame (CTS frame 902b, 1002b, 1102b, 1202b) over the secondary frequency channel (CH2) confirming reservation of the secondary frequency channel for the second single time interval.

In yet other implementations, the method may further comprise transmitting by the access point at least one of a contention free end frame (CF end frame 906a) over the primary frequency channel to clear the first single time interval on the primary frequency channel (CH1) based on not receiving a confirmation frame (CTS frame 902a, 1002a, 1102a, 1202a) over the primary frequency channel (CH1), and a contention free end frame (CF end frame 906b, 1006b, 1106b) over the secondary frequency channel (CH2) to clear the second single time interval on the secondary frequency channel (CH2).

In yet other implementations, the method may further comprise transmitting by the access point a CTS to self frame (912a, 1112a) over the primary frequency channel (CH1) to maintain reservation of the primary frequency channel for the second single time interval based on receiving the confirmation frame (CTS frame 902b, 1002b, 1102b, 1202b) over the secondary frequency channel (CH2) and not over the primary frequency channel (CH1).

In yet other implementations, the first reservation frame (1208a) is transmitted based on the access point receiving an RTS frame (RTS frame 1204a).

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, in some implementations, at least a portion of the multiplex control module 224, and/or at least a portion of the transceiver 214, previously described in connection with FIGS. 1 and 2 may also be known as "means for transmitting a first reservation frame utilizing the primary frequency channel," "means for transmitting a second reservation frame utilizing the secondary frequency channel," "means for communicating between the access point and the plurality of wireless devices over the primary frequency channel during the first single time interval and over the secondary frequency channel during the second single time interval," "means for receiving a confirmation frame over the primary frequency channel," "means for receiving a confirmation frame over the primary frequency channel," "means for transmitting a contention free end frame over the primary frequency channel," "means for transmitting a contention free end frame over the secondary frequency channel," "means for transmitting a clear to send to self frame over the primary frequency channel," and/or "means for transmitting the first reservation frame based on receiving a request to send frame."

The various illustrative logical blocks, modules and circuits described in connection with the present disclosure may be implemented or performed with a general purpose processor, a digital signal processor (DSP), an application specific integrated circuit (ASIC), a field programmable gate array (FPGA) signal or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. For example, a non-transitory, computer-readable medium may comprise code that, when executed, may cause an apparatus to perform any steps, actions, or method described in this application. Such a medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications in a communication system over a primary frequency channel and a secondary frequency channel, comprising:
   transmitting by an access point a first reservation frame utilizing the primary frequency channel, the first reservation frame indicating a first single time interval reserved for uplink and downlink communications over the primary frequency channel with a plurality of wireless devices;
   transmitting by the access point a second reservation frame utilizing the secondary frequency channel, the second reservation frame indicating a second single time interval reserved for uplink and downlink communications over the secondary frequency channel with the plurality of wireless devices;
   transmitting by the access point a clear to send (CTS) to self frame over the primary frequency channel to maintain reservation of the primary frequency channel for the first single time interval based on receiving a confirmation frame over the secondary frequency channel and not over the primary frequency channel; and
   communicating between the access point and the plurality of wireless devices over at least one of the primary frequency channel during the first single time interval and the secondary frequency channel during the second single time interval.

2. The method of claim 1, further comprising transmitting by the access point at least one of:
   a contention free end frame over the primary frequency channel to clear the first single time interval on the primary frequency channel based on not receiving a confirmation frame over the primary frequency channel, and
   a contention free end frame over the secondary frequency channel to clear the second single time interval on the secondary frequency channel based on not receiving a confirmation frame over the secondary frequency channel.

3. The method of claim 1, further comprising receiving by the access point at least one of:
   a confirmation frame over the primary frequency channel confirming reservation of the primary frequency channel for the first single time interval, and
   a confirmation frame over the secondary frequency channel confirming reservation of the secondary frequency channel for the second single time interval.

4. The method of claim 3, wherein the confirmation frame comprises a CTS frame.

5. The method of claim 1, wherein the first reservation frame and the second reservation frame each comprise one of a request to send (RTS) frame, a CTS frame, and a trigger frame.

6. The method of claim 1, wherein at least the first reservation frame is transmitted based on the access point receiving a request to send frame.

7. An access point for wireless communications in a communication system over a primary frequency channel and a secondary frequency channel, the access point comprising:
   a processor configured to instruct a transceiver to:
      transmit a first reservation frame utilizing the primary frequency channel, the first reservation frame indicating a first single time interval reserved for uplink and downlink communications over the primary frequency channel with a plurality of wireless devices,
      transmit a second reservation frame utilizing the secondary frequency channel, the second reservation frame indicating a second single time interval reserved for uplink and downlink communications over the secondary frequency channel with the plurality of wireless devices,
      transmit a clear to send (CTS) to self frame over the primary frequency channel to maintain reservation of the primary frequency channel for the first single time interval based on receiving a confirmation frame over the secondary frequency channel and not over the primary frequency channel, and
      communicate with the plurality of wireless devices over at least one of the primary frequency channel during the first single time interval and the second frequency channel during the second single time interval.

8. The access point of claim 7, wherein the processor is further configured to instruct the transceiver to transmit at least one of:
   a contention free end frame over the primary frequency channel to clear the first single time interval on the primary frequency channel based on not receiving a confirmation frame over the primary frequency channel; and
   a contention free end frame over the secondary frequency channel to clear the second single time interval on the secondary frequency channel based on not receiving a confirmation frame over the secondary frequency channel.

9. The access point of claim 7, wherein the transceiver is further configured to receive at least one of:
   a confirmation frame over the primary frequency channel confirming reservation of the primary frequency channel for the first single time interval; and
   a confirmation frame over the secondary frequency channel confirming reservation of the secondary frequency channel for the second single time interval.

10. The access point of claim 9, wherein the confirmation frame comprises a CTS frame.

11. The access point of claim 7, wherein the first reservation frame and the second reservation frame comprise one of a request to send (RTS) frame, a CTS to self frame, and a trigger frame.

12. The access point of claim 7, wherein the processor is further configured instruct the transceiver to transmit at least the first reservation frame based on the transceiver receiving a request to send frame.

13. A non-transitory, computer-readable medium comprising code that, when executed, causes an access point for wireless communications in a communication system over a primary frequency channel and a secondary frequency channel to:
   transmit a first reservation frame utilizing the primary frequency channel, the first reservation frame indicating a first single time interval reserved for uplink and downlink communications over the primary frequency channel with a plurality of wireless devices;

transmit a second reservation frame utilizing the secondary frequency channel, the second reservation frame indicating a second single time interval reserved for uplink and downlink communications over the secondary frequency channel with the plurality of wireless devices;

transmit a clear to send (CTS) to self frame over the primary frequency channel to maintain reservation of the primary frequency channel for the first single time interval based on receiving a confirmation frame over the secondary frequency channel and not over the primary frequency channel; and communicate between the access point and the plurality of wireless devices over the primary frequency channel during the first single time interval and over the secondary frequency channel during the second single time interval.

14. The medium of claim 13, wherein the code, when executed, further causes the access point to transmit at least one of:

a contention free end frame over the primary frequency channel to clear the first single time interval on the primary frequency channel based on not receiving a confirmation frame over the primary frequency channel, and a contention free end frame over the secondary frequency channel to clear the second single time interval on the secondary frequency channel based on not receiving a confirmation frame over the secondary frequency channel.

15. The medium of claim 13, wherein the code, when executed, further causes the access point to transmit at least one of:

a confirmation frame over the primary frequency channel confirming reservation of the primary frequency channel for the first single time interval, and a confirmation frame over the secondary frequency channel confirming reservation of the secondary frequency channel for the second single time interval.

16. The medium of claim 15, wherein the confirmation frame comprises a CTS frame.

17. The medium of claim 13, wherein the first reservation frame and the second reservation frame each comprise one of a request to send (RTS) frame, a CTS to self frame, and a trigger frame.

18. The medium of claim 13, wherein at least the first reservation frame is transmitted based on the access point receiving a request to send frame.

19. An access point for wireless communications in a communication system over a primary frequency channel and a secondary frequency channel, the access point comprising:

means for transmitting a first reservation frame utilizing the primary frequency channel, the first reservation frame indicating a first single time interval reserved for uplink and downlink communications over the primary frequency channel with a plurality of wireless devices;

means for transmitting a second reservation frame utilizing the secondary frequency channel, the second reservation frame indicating a second single time interval reserved for uplink and downlink communications over the secondary frequency channel with a plurality of wireless devices;

means for transmitting a clear to send (CTS) to self frame over the prima frequency channel to maintain reservation of the primacy frequency channel for the first single time interval based on receiving the confirmation frame over the secondary frequency channel and not over the primary frequency channel; and means for communicating between the access point and the plurality of wireless devices over the primary frequency channel during the first single time interval and over the secondary frequency channel during the second single time interval.

20. The access point of claim 19, further comprising at least one of:

means for transmitting a contention free end frame over the primary frequency channel to clear the first single time interval on the primary frequency channel based on not receiving a confirmation frame over the primary frequency channel, and means for a transmitting a contention free end frame over the secondary frequency channel to clear the second single time interval on the secondary frequency channel based on not receiving a confirmation frame over the secondary frequency channel.

21. The access point of claim 19, further comprising at least one of:

means for receiving a confirmation frame over the primary frequency channel confirming reservation of the primary frequency channel for the first single time interval; and means for receiving a confirmation frame over the secondary frequency channel confirming reservation of the secondary frequency channel for the second single time interval.

22. The access point of claim 21, wherein the confirmation frame comprises a CTS frame.

23. The access point of claim 19, wherein the first reservation frame and the second reservation frame each comprise one of a request to send (RTS) frame, a clear to send (CTS) to self frame, and a trigger frame.

24. The access point of claim 19, further comprising means for transmitting the at least first reservation frame based on receiving a RTS frame.

\* \* \* \* \*